United States Patent
Matsuda

(10) Patent No.: US 7,810,022 B2
(45) Date of Patent: Oct. 5, 2010

(54) PROGRAM, INFORMATION PROCESSING METHOD, AND INFORMATION PROCESSING APPARATUS

(75) Inventor: Kouichi Matsuda, Tokyo (JP)

(73) Assignee: Sony Corporation, Tokyo (JP)

(*) Notice: Subject to any disclaimer, the term of this patent is extended or adjusted under 35 U.S.C. 154(b) by 999 days.

(21) Appl. No.: 11/471,683

(22) Filed: Jun. 21, 2006

(65) Prior Publication Data

US 2006/0294454 A1 Dec. 28, 2006

(30) Foreign Application Priority Data

Jun. 22, 2005 (JP) ............................. 2005-182007

(51) Int. Cl.
*G06F 17/00* (2006.01)
(52) U.S. Cl. ..................................... 715/206
(58) Field of Classification Search ................ 715/273, 715/856, 207, 206
See application file for complete search history.

(56) References Cited

U.S. PATENT DOCUMENTS

| | | | | |
|---|---|---|---|---|
| 6,496,205 B1* | 12/2002 | White et al. | ................. | 715/824 |
| 6,622,306 B1* | 9/2003 | Kamada | ...................... | 725/109 |
| 6,772,394 B1 | 8/2004 | Kamada | | |
| 7,030,845 B2* | 4/2006 | Maa | ............................. | 345/88 |
| 7,107,517 B1* | 9/2006 | Suzuki et al. | ................ | 715/207 |
| RE40,361 E* | 6/2008 | Yamanaka et al. | ........... | 715/205 |
| 2003/0067484 A1* | 4/2003 | Moir | ........................ | 345/747 |
| 2004/0135819 A1* | 7/2004 | Maa | ............................. | 345/840 |
| 2005/0149853 A1* | 7/2005 | Naitou | ..................... | 715/501.1 |

FOREIGN PATENT DOCUMENTS

| | | |
|---|---|---|
| EP | 1300780 A1 | 4/2003 |
| JP | 05-150903 | 6/1993 |
| JP | 09-274554 | 10/1997 |
| JP | 09-311760 | 12/1997 |
| JP | 11-338878 | 12/1999 |
| JP | 2001-324344 | 11/2001 |
| JP | 2004-200866 | 7/2004 |
| JP | 2004-279682 | 10/2004 |
| WO | WO 98/12871 | 3/1998 |

OTHER PUBLICATIONS

Dreher, Electronic Poetry: Student-Constructed Hypermedia, Google Nov. 2000, pp. 1-2.*

* cited by examiner

*Primary Examiner*—Cong-Lac Huynh
(74) *Attorney, Agent, or Firm*—Oblon, Spivak, McClelland, Maier & Neustadt, L.L.P.

(57) ABSTRACT

An information processing method displays information including at least one processing region subject to processing and displays a cursor on the displayed information. The method includes assigning the processing region to an operating element of an operation input device in accordance with a positional relationship between a cursor display position of the cursor on a display screen and the processing region, in the processing region on the display screen, displaying an operating element image representing the assigned operating element, and, in response to an operation input from the assigned operating element, executing processing corresponding to the processing region assigned to the operating element.

13 Claims, 26 Drawing Sheets

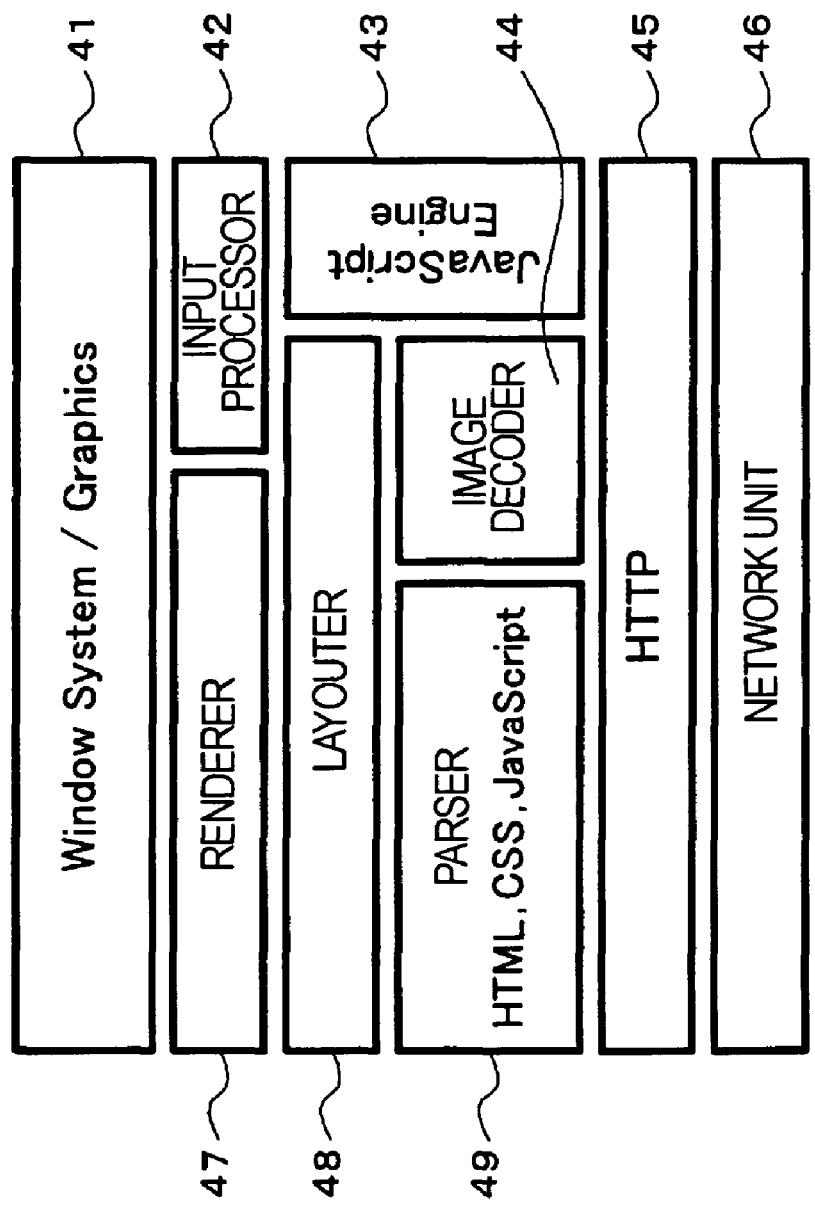

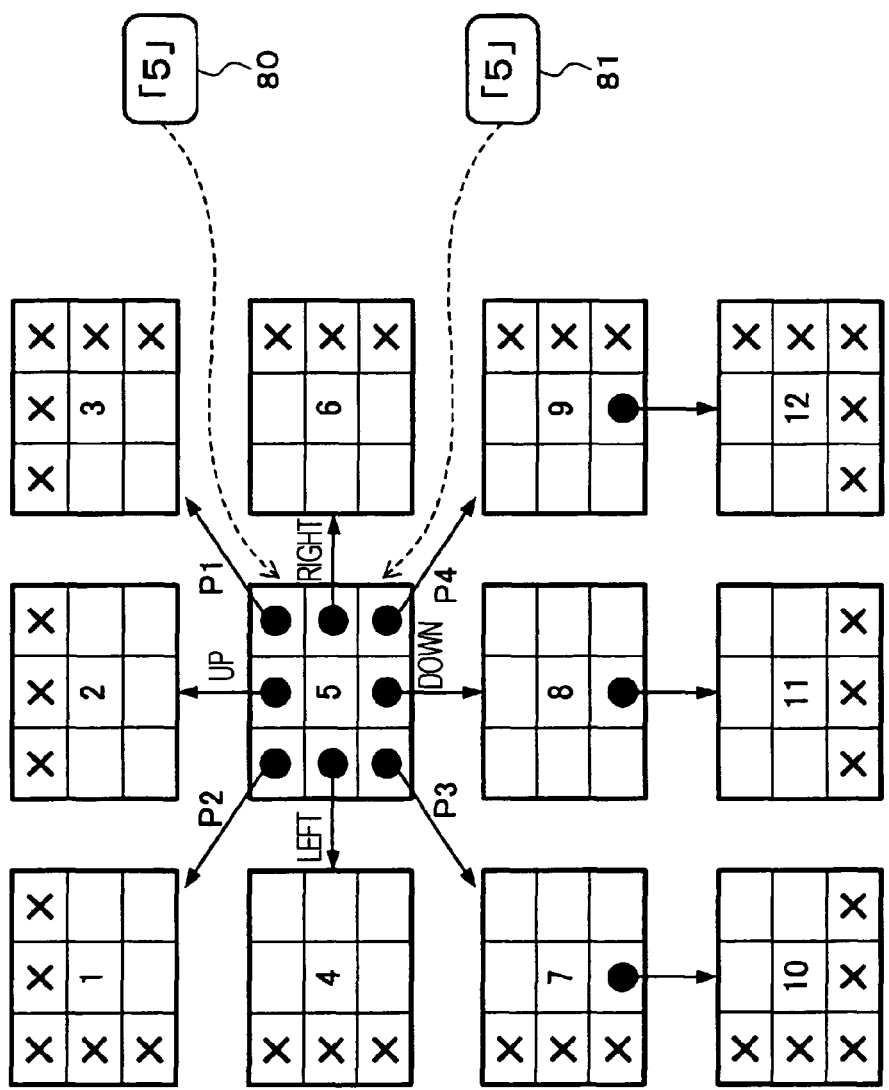

FIG. 7

With widespread use of VCRs ①that record television broadcast programs on video cassettes, a viewing manner has become popular which is based on the concept of a so-called "time shift" in which a viewer views a television broadcast program in a viewer's convenient time by recording ③ the program. Recently, with widespread use of DVRs ⑨ as video recorders having built-in HDDs ⑦, a large number of programs can easily be recorded, and video recording can be performed by automatic reservation. ⑧ This condition decreases the need to view a program in its broadcast time in real time, thus spreading time shift viewing.

FIG. 23

With widespread use of VCRs that record television broadcast programs on video cassettes, a viewing manner has become popular which is based on the concept of a so-called "time shift" in which a viewer views a television broadcast program in a viewer's convenient time by recording the program. Recently, with widespread use of DVRs as video recorders having built-in HDDs, a large number of programs can easily be recorded, and video recording can be performed by automatic reservation. This condition decreases the need to view a program in its broadcast time in real time, thus spreading time shift viewing.

PROGRAM, INFORMATION PROCESSING METHOD, AND INFORMATION PROCESSING APPARATUS

CROSS REFERENCES TO RELATED APPLICATIONS

The present invention contains subject matter related to Japanese Patent Application JP 2005-182007 filed in the Japanese Patent Office on Jun. 22, 2005, the entire contents of which are incorporated herein by reference.

BACKGROUND OF THE INVENTION

1. Field of the Invention

The present invention relates to a program, information processing method, and information processing apparatus which display information including a region subject to processing, such as a link portion, and which serve as, for example, a browser.

2. Description of the Related Art

Today, with widespread use of the Internet, software (browser) for browsing information on the Internet is used in various environments. When a personal computer is used to browse information, in many cases, by using a mouse to easily perform operations, page ejection and linking to other information are performed.

In addition, in recent years, among various types of electronic apparatuses (other than personal computers), such as television receivers, audio-visual apparatuses, and cellular phones, apparatuses that can browse information such as web site information on the Internet have come into wide use. However, when an apparatus of the above type is used, a situation often occurs in which information is browsed in an environment having no mouse as an operating device for a user. For example, in the case of a television receiver having a browsing function, a remote commander is used for operations performed when information on the Internet is browsed.

SUMMARY OF THE INVENTION

In an environment having no mouse, it is necessary to develop an operation for opening a link which is embedded in information displayed by a browser and which is linked to other information. That is, instead of clicking on a link portion by using the mouse, another appropriate operation is necessary.

As a link opening operation (hereinafter referred to as a "link operation") in an environment using no mouse, what is most frequently used is an operation technique that performs positioning of a cursor at a link portion, using cursor buttons of a remote commander to move the cursor to a link to be clicked on, and pressing a setting key.

A state in which page information such as information on the Internet is displayed on a screen by a browsing function is shown in FIG. 26. The displayed page information, that is, displayed sentences include, at a plurality of positions, link portions 101 in which links are set. The link portions 101, that is, display regions as portions in which links are set, are hereinafter referred to as "links 101". The links 101 are indicated, as the portions in which links are set, by underlines and colors different from those used in the other portions.

In addition, at this time, a cursor 100 is positioned at a link 101 for the characters "views".

When a remote commander is used to perform a link operation, the cursor 100 is moved to a desired link 101 by using arrow buttons (arrow keys) for moving the cursor 100. By pressing, for example, a downward arrow button, the cursor 100 is moved to a link 101 for the characters "HDDs". To press a setting key in this state is an operation similar to clicking with a mouse. Accordingly, processing in accordance with link setting for "HDDs" is performed. For example, linked data is displayed.

In this case, in an operation using no mouse, before a desired link 101 is clicked on, it is necessary to press the cursor 100 a plurality of times by using the arrow buttons or the like, in order for the cursor 100 to reach the desired link 101. In other words, the operation necessary up to executing a link is very complicated compared with the case of using the mouse.

In order to easily realize the link operation, there is a technique (see, for example, Japanese Unexamined Patent Application Publication No. 2004-200866) in which a description designating a particular operation button as an access key is included in a link description in information displayed in a browser and the designated operation button is operated to perform direct link processing. However, in this case, an information distributor needs to designate the access key and the access key is fixed. In addition, operation buttons of a remote commander or the like in an environment in which the browser is in operation differ depending on each system. Thus, a problem occurs in that optimization for the system is difficult.

A case in which an operation is performed on each link 101, which serves as a region subject to processing, has been described above. However, regions subject to processing in which processing is performed by positioning the cursor 100 on the screen include icons, operating element images, text boxes, and pull-down list boxes of various types. In the case in which these regions subject to processing are operated in environments using no mouse, a similar problem occurs.

Accordingly, it is desirable to facilitate operations on various regions subject to processing, such as a link operation, even in an environment using no mouse.

According to an embodiment of the present invention, there is provided an information processing method for displaying information including at least one processing region subject to processing and displaying a cursor on the displayed information. The information processing method includes the steps of assigning the processing region to an operating element of an operation input device in accordance with a positional relationship between a cursor display position of the cursor on a display screen and the processing region, in the processing region on the display screen, displaying an operating element image representing the assigned operating element, and, in response to an operation input from the assigned operating element, executing processing corresponding to the processing region assigned to the operating element.

Preferably, the processing region is a link portion in which a link to other information is set, and, when the processing is executed, in response to the operation input from the operating element to which the processing region is assigned as the link portion, linking corresponding to the link portion assigned to the operating element is executed.

In assignment of the processing region, when the displayed cursor is positioned in one processing region, in accordance with a positional relationship between a display position of the positioned cursor and a different processing region, the different processing region may be assigned to the operating element of the operation input device.

The information processing method may further include the step of switching on and off displaying the operating element image in response to the operation input when the operation input is a particular operation input.

When the operating element image is displayed, in accordance with the positional relationship between the cursor display position on the display screen and the processing region, a display position of the operating element image in the vicinity of the processing region may be determined.

According to another embodiment of the present invention, there is provided an information processing apparatus for displaying information including at least one processing region subject to processing and displaying a cursor on the displayed information. The information processing apparatus includes assigning means for assigning the processing region to an operating element of an operation input device in accordance with a positional relationship between a cursor display position of the cursor on a display screen and the processing region, operating-element-image displaying means for displaying, in the processing region on the display screen, an operating element image representing the operating element to which the processing region is assigned by the assigning means, and processing executing means for executing, in response to an operation input from the operating element to which the processing region is assigned by the assigning means, processing corresponding to the processing region assigned to the operating element.

According to an embodiment of the present invention, there is provided a program for allowing an information processing apparatus to execute displaying information including at least one processing region subject to processing and displaying a cursor on the displayed information. The program includes the steps of assigning the processing region to an operating element of an operation input device in accordance with a positional relationship between a cursor display position of the cursor on a display screen and the processing region, in the processing region on the display screen, displaying an operating element image representing the assigned operating element, and, in response to an operation input from the assigned operating element, executing processing corresponding to the processing region assigned to the operating element.

According to an embodiment of the present invention, by operating an operating element, corresponding to an operating element image displayed on a processing region, for example, a particular button of a remote commander, a user can perform a direct operation on the processing region.

For example, by operating an operating element corresponding to an operating element image displayed in a link portion, the user can perform an operation of directly selecting a link. In other words, an advantage is obtained in that, even in an environment using no mouse, a very simplified operation can realize an operation, such as a link operation, on a processing region.

In addition, assignment of each link to each button is performed in accordance with a positional relationship between a cursor on a screen and a processing region. Thus, the assignment is user-friendly, thus also realizing comfortable operability.

Furthermore, in operating element assignment to a processing region, whenever a displayed cursor is positioned in a processing region, in accordance with a positional relationship between the position of the positioned cursor and a different processing region, the different processing region is assigned to an operating element of an operation input device, whereby, even for cursor movement, button assignment is performed at all times in a state suitable for operation. This is also suitable for simplified operation.

Moreover, according to an embodiment of the present invention, a display position of an operating element image is dynamically calculated and displayed in accordance with a cursor position. Thus, the operating element image is displayed at an appropriate position in accordance with the cursor position, so that an operating element corresponding to a desired processing region can be easily recognized by a user.

Also, by switching off displaying the operating element image if it is unnecessary, a display screen can be adapted for user's preference and idea.

According to an embodiment of the present invention, since an information processing apparatus assigns an operating element to a processing region, appropriate assignment adapted for system environments can be performed.

BRIEF DESCRIPTION OF THE DRAWINGS

FIG. 5 is an illustration of software blocks having a browsing function according to an embodiment of the present invention;

FIGS. 6A and 6B are illustrations of a pointer structure in an embodiment of the present invention;

FIG. 7 is an illustration of an X-axis box and Y-axis box for use in an assigning process in an embodiment of the present invention;

FIG. 23 is an illustration of an example of a display range of data in the embodiment of the present invention;

DESCRIPTION OF THE PREFERRED EMBODIMENTS

Embodiments of the present invention are described below in the following order:
1. Embodiment Overview;
2. System Configuration;
3. Structure for Assignment; and
4. Browsing

1. Embodiment Overview

An embodiment of the present invention is described by using an example in which it is practiced in a television system having a function of browsing information obtained from a network such as the Internet. In the embodiment, a link portion in which a link is set is described as an example of a processing region (subject to processing) on a display screen. Before describing a system configuration, an example of a screen displayed by a browsing function is used to describe features of the embodiment.

Figure 1:
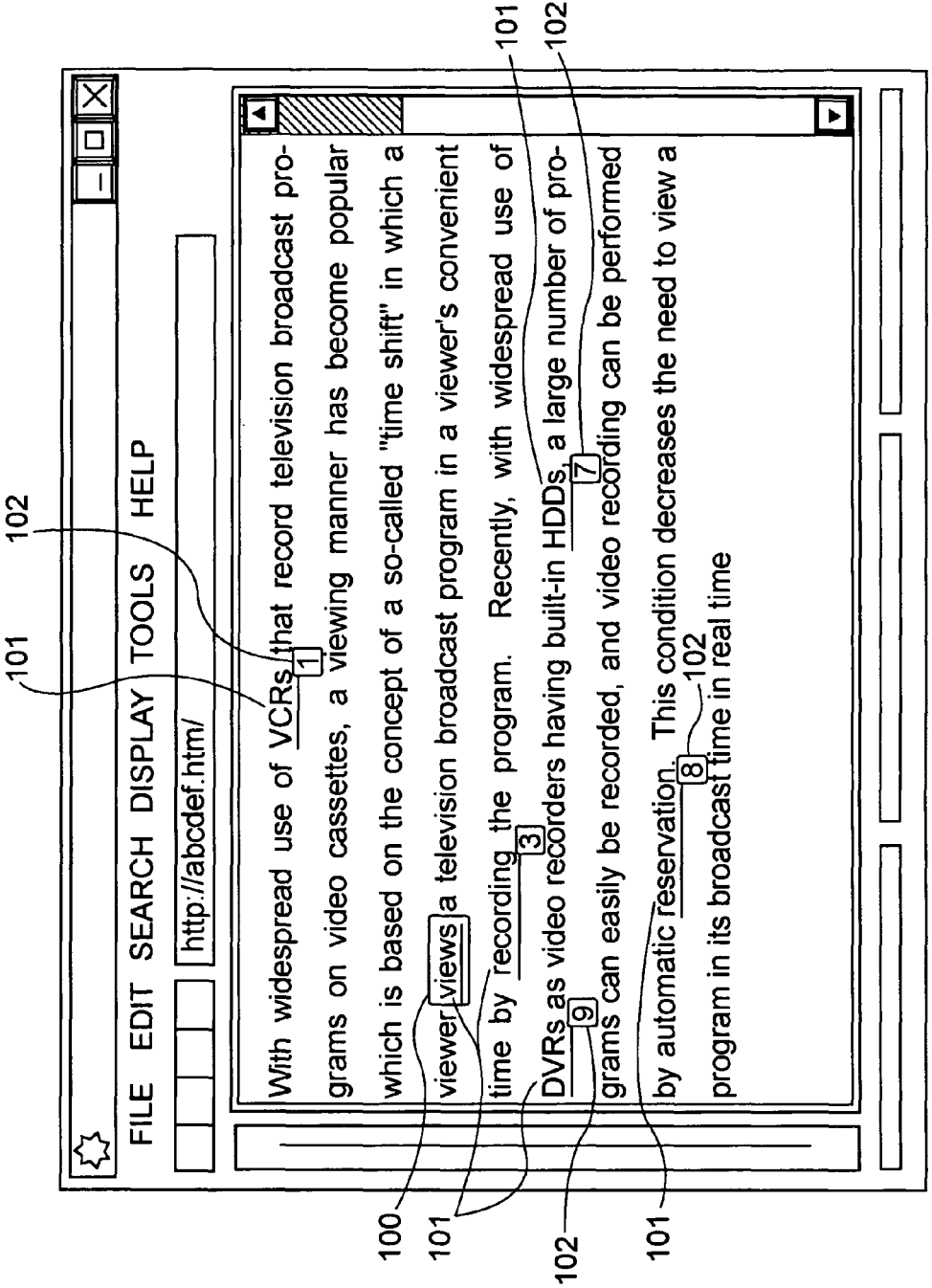
FIG. 1 is an illustration of an example of a displayed screen in an embodiment of the present invention.

FIG. 1 shows the example of the screen displayed by a browsing function in the system in the embodiment. The screen displays sentences which are included in information of a Web site, or the like, on the Internet. The sentences include links to other information, for example, link portions 101 (hereinafter referred to as "links 101") in each of which, for example, an URL (uniform resource locator) or the like is set. Underlines or display colors different from those of other portions are used to indicate that the links 101 are link portions. At this time, a cursor 100 is positioned at the link 101 set for the characters "views".

Figure 4:
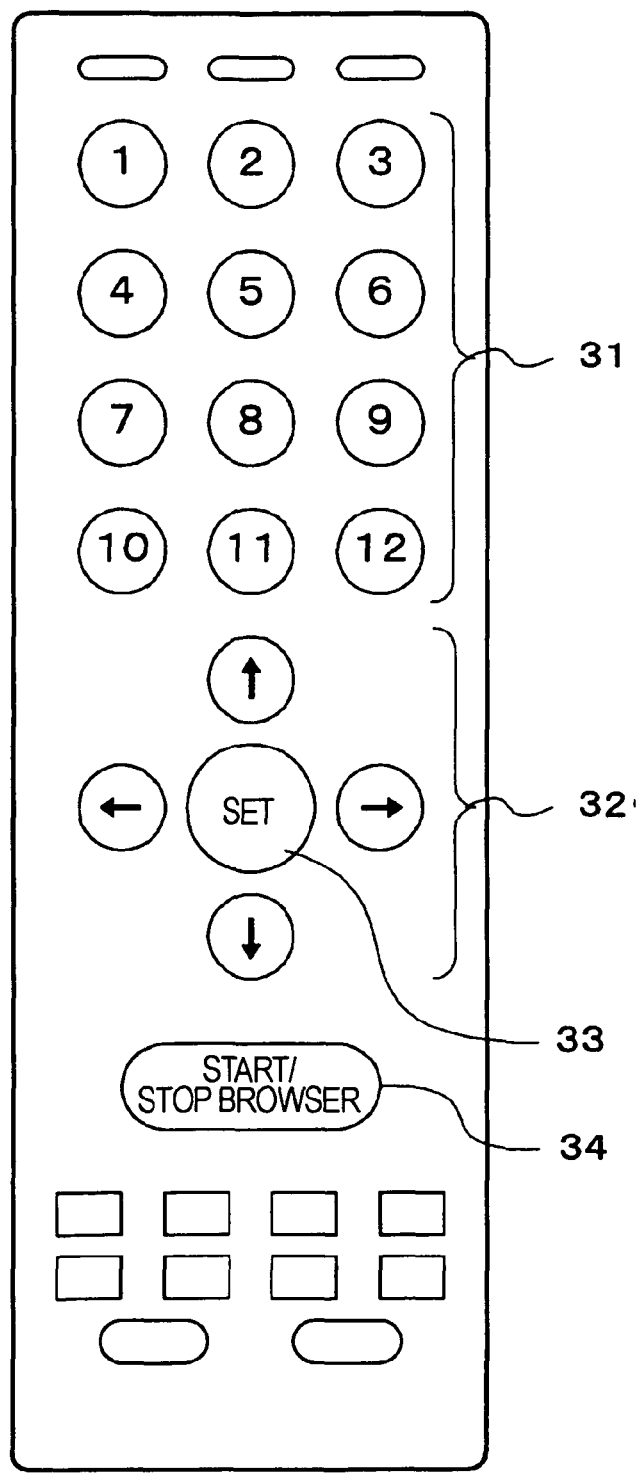
FIG. 4 is an illustration of a remote commander according to an embodiment of the present invention.

When a remote commander 3, which is described later with reference to FIG. 4, is used to perform an operation, arrow buttons 32 are used in order to move the cursor 100. By using upward, downward, right, and left arrow buttons as the arrow buttons 32, the cursor 100 can be selected and the links 101 can sequentially be selected in each direction indicated by each arrow button. By pressing the SET button 33 shown in FIG. 4 in a state in which the cursor 100 is position at one link 101, a link function of the link 101 designated by the cursor 100 is activated to perform link processing.

As described above, an operation using the arrow buttons 32 and the SET button 33 is a link operation similar to that in the related art. In this embodiment, by way of example, by using numerical buttons 31, a more facilitated link operation can be executed.

The remote commander 3 shown in FIG. 4 is a remote commander for a television system (a tuner apparatus 2, which is described later), and includes the numerical buttons 31, specifically, "1" to "12" as operation buttons for tuning. In this example, assignment is performed so that positional relationships between the cursor 100 and the links 101 correspond to positional relationships around, for example, a "5" button among the numerical buttons 31. Button icons 102 that indicate assigned operating units (the numerical buttons 31) are displayed on the screen shown in FIG. 1. For example, in FIG. 1, when the cursor 100 is positioned at one link 101 for the words "views", a "1" button among the numerical buttons 31 is assigned to one link 101 for the word "VCRs". A button icon 101 indicating "1" is displayed in the vicinity of "VCRs" in a superimposing manner. Similarly, "3", "7", "9", and "8" buttons are assigned to other links 101 for the words "recording", "HDDs", "DVRS", and "reservation", respectively, and corresponding button icons 102 are displayed so as to be superimposed on the buttons.

A user can directly perform a link operation on each displayed link 101. For example, in the state shown in FIG. 1, since the cursor 100 is positioned at the link 101 for "views", by operating the SET button 33 (or even the "5" button), link processing concerning "views" is performed, and the other links 101 can be directly operated. Pressing, for example, a "1" button, is a directly a link operation on the link 101 for "VCRs", and processing based on link setting for the "VCRs" is performed. Similarly, pressing the "8" button is directly a link operation on the link 101 for "reservation", and processing based on link setting for "reservation" is performed. In other words, a link operation can be executed as performing an operation on one numerical button 31 at a time for one link 101 displayed on the screen without performing the set operation after sequentially moving the cursor 100. Examples of a configuration and processing for realizing such a link operation are described below.

2. System Configuration

Figure 2:
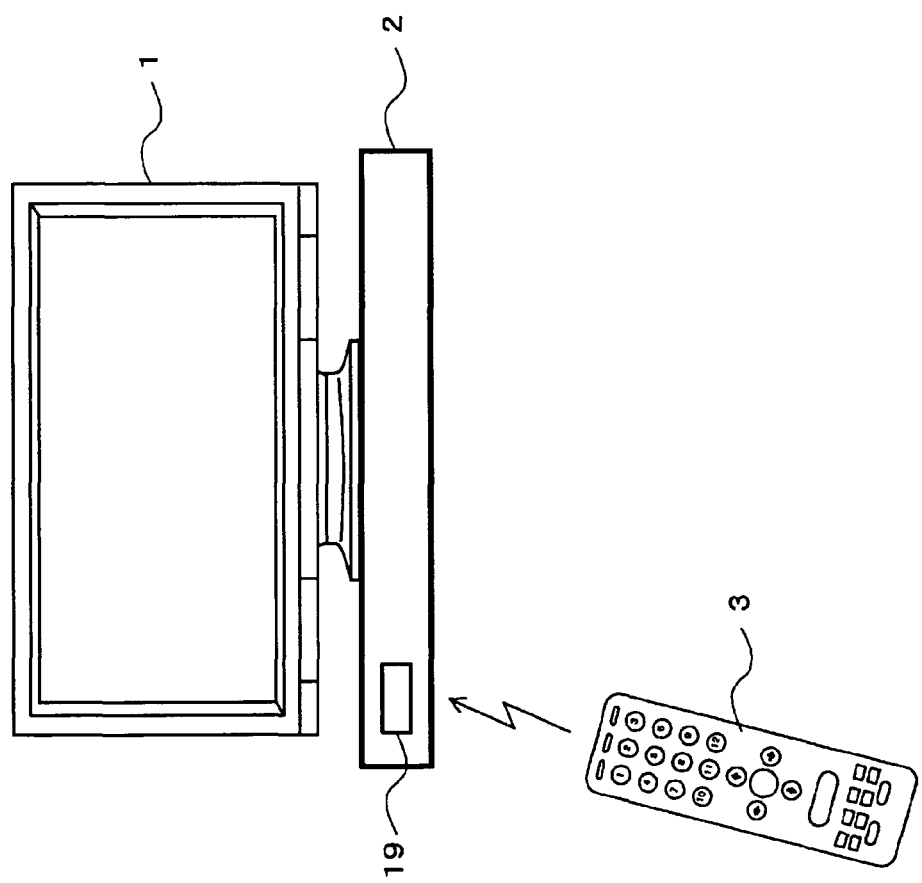
FIG. 2 is an illustration of a television system according to an embodiment of the present invention.

FIG. 2 shows a television system according to the embodiment of the present invention. This television system includes a monitoring device 1 and a tuner apparatus 2 which are connected to each other. In addition, for user's operations, the remote commander 3 is used. The remote commander 3 outputs infrared command signals in response to operations on various buttons. The infrared command signals are received by a photo receiving unit 19 of the tuner apparatus 2. The tuner apparatus 2 includes, for example, a tuner 11 for terrestrial broadcasting and satellite broadcasting, and receives and demodulates a stream video signal of a broadcast program. The video signal is supplied to the monitoring apparatus 1 for display, which has a screen such as a CRT (cathode-ray tube), a liquid crystal display panel, or a plasma display panel. The tuner apparatus 2 has a communication function for a network such as the Internet and a browser function, and can display data of a Web site or the like on the monitoring apparatus 1. Although, in FIG. 2, the tuner apparatus 2 and the monitoring apparatus 1 are separate apparatuses, also a case in which both are integrated into a television receiver is considered as the embodiment of the present invention.

Figure 3:
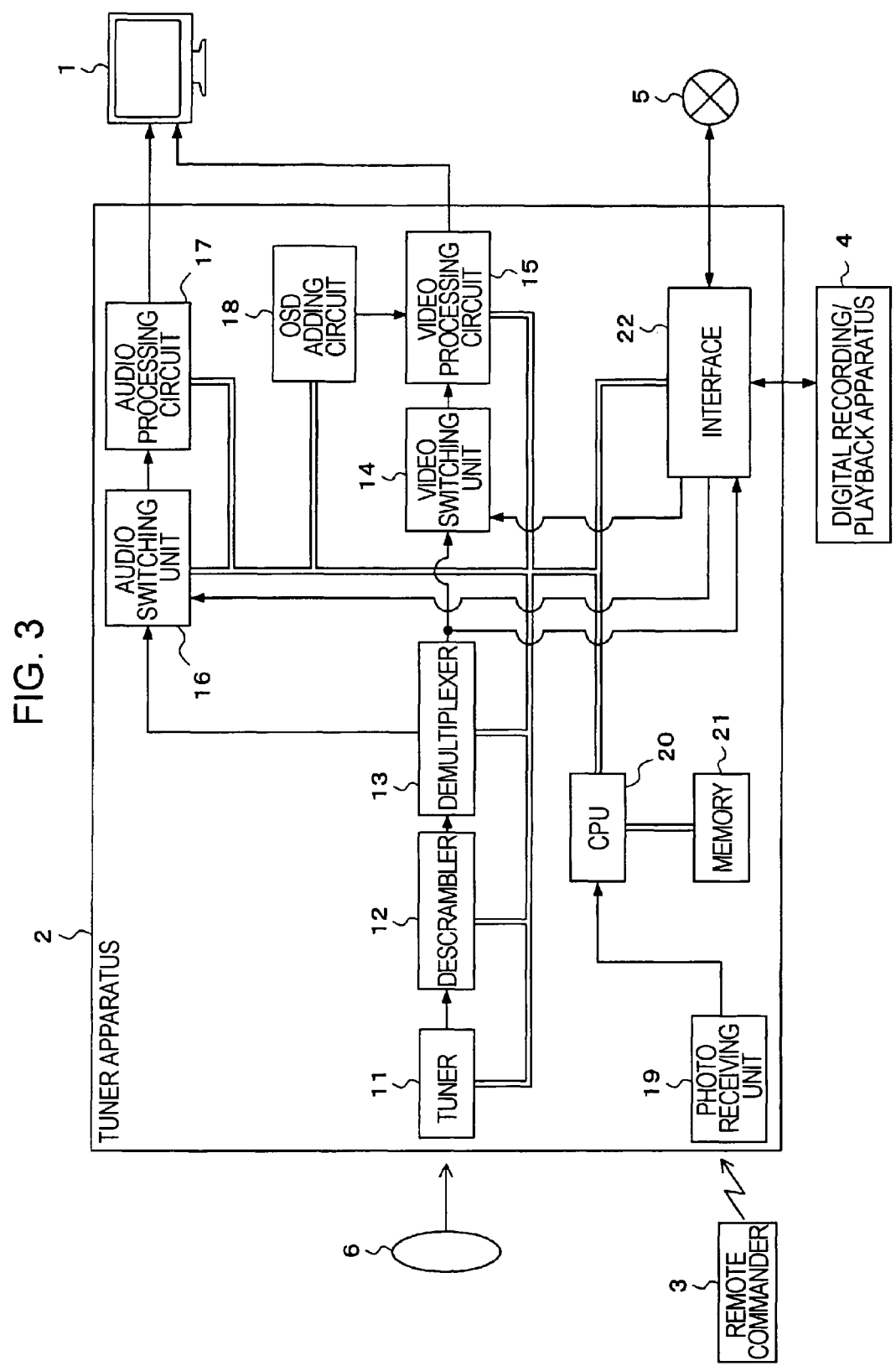
FIG. 3 is a block diagram showing a tuner apparatus.

FIG. 3 shows a detailed configuration of the tuner apparatus 2. The tuner apparatus 2 includes the tuner 11 as a broadcasting receiving function for terrestrial broadcasting or satellite broadcasting, and performs reception and demodulation on, for example, digital broadcasting waves received as a broadcast signal by an antenna 6. The receiving function may not be necessarily a form in which broadcast waves received by the antenna 6 are demodulated. However, a tuner or decoder for cable television broadcasts and streaming broadcasts supplied through a network such as the Internet may be provided. The broadcast signal received by the tuner 11 is decoded by a descrambler 12 for descrambling, and the descrambled signal is supplied to a demultiplexer 13. The demultiplexer 13 separates an encoded video signal and audio signal from a transport stream of the received multiplexed digital broadcast signal.

The video signal separated by the demultiplexer 13 is displayed to a video processing circuit 15 through a video switching unit 14. The supplied video signal is converted by the video processing circuit 15 into a video signal complying with encoded data decoding or a predetermined standard such as NTSC (National Television System Committee). The converted video signal is output to the monitoring apparatus 1.

Obviously, the predetermined standard may be PAL (phase alternation line), SECAM (sequential color and memory), or the like. In addition, there are various output signal forms such as, in each standard, a composite video signal, a Y/C signal, and RGB signals. The audio signal separated by the demultiplexer 13 is supplied to an audio processing circuit 17 through an audio switching unit 16. The audio processing circuit 17 performs encoded data decoding and analog-to-digital conversion on the supplied audio signal, and supplies the processed signal to the monitoring apparatus 1. The monitoring apparatus 1 outputs to display the video signal supplied as described above, and outputs the audio signal from a speaker.

The OSD adding circuit 18 generates display image data on the basis of control by a CPU (central processing unit) 20. When the OSD adding circuit 18 generates image data such as various types of characters, icons, a turtle cursor, and a menu image, the image data is superimposed on the video signal by the video processing circuit 15, or is switched from the video signal by the video processing circuit 15. The processed video signal is supplied to the monitoring apparatus 1, and the image data is displayed. The image data generated by the OSD adding circuit 18 include, for example, GUI (graphical user interface) images such as a menu for various operations and icons, a message, a channel, a volume representation, and an image based on the browsing function.

An interface 22 performs communication with a network 5 such as the Internet and external apparatuses. The interface 22 may be, for example, an interface complying with a standard such as the IEEE (Institute of Electrical and Electronic Engineers) 1394 or USB (Universal Serial Bus), and can also form the Ethernet or a LAN (local area network). The interface 22 has no limitations on its interface method, communication form, network structure, etc. However, in FIG. 3, the interface 22 is overall shown as a part for realizing an Internet communication function and a function of communication with an external apparatus such as the digital recording/playback apparatus 4. Video data and audio data that are supplied from the network 5, or an external apparatus such as the digital recording/playback apparatus 4, are supplied and processed in a predetermined manner in the video processing circuit 15 and the audio processing circuit 17 after passing the video switching unit 14 and the audio switching unit 16. The processed video data and audio data can be output by the monitoring apparatus 1 instead of the broadcast video and audio received by the tuner 11.

The CPU 20 functions as a controller that controls the entirety of the tuner apparatus 2. In other words, in response to user's operations and operating programs, the CPU 20 performs processing such as instructing the tuner 11 to perform tuning, instructing the descrambler 12 and the demultiplexer 13 to perform processing, controlling the video switching unit 14 and the audio switching unit 16 to perform switching, instructing the audio processing circuit 17 to perform processing, instructing the OSD adding circuit 18 to generate an OSD image. The CPU 20 also functions as a browser for data of Internet sites, etc. In other words, the CPU 20 can perform processing such as accessing a Web site or the like by using the interface 22 and executing display of an image obtained by the Web site or the like, and performing link processing.

A memory 21 includes (collectively shows memory areas such as a ROM (read-only memory) and a flash memory that are accessed by the CPU 20. The ROM in the memory 21 stores platform software modules, activating modules, etc., which allows the CPU 20 to operate. The RAM in the memory 21 temporarily stores platform software programs, such as the activating modules stored in the ROM and an OS (operating system), application programs, or parameters that vary, if necessary, when each program is executed. The RAM in the memory 21 is also used as a work area for various types of calculation. The flash memory in the memory 21 is used to store information (for example, various processing coefficients and history information) that should not be lost even in a power-off state.

The remote commander 3 is used as an operation input device for user's operations. By operating the remote commander 3 by the user, an operation signal is output, for example, as an infrared signal. This infrared operation signal is received and converted by the photo receiving unit 19 into an electrical signal. The electrical signal is sent to the CPU 20. In other words, the user can send various instructions and inputs by using operating elements of the remote commander 3. The CPU 20 detects operation input information sent from the remote commander 3 and performs predetermined control. Obviously, the CPU 20 controls the tuner apparatus 2 to perform processing directed by the user. The signal from the remote commander 3 is not limited to the infrared signal, but may be a radio signal. Similar operations can be performed by using operation keys, operation dials, etc., in a panel operation unit (not shown) provided on a housing for the tuner apparatus 2. Operations of the user with the remote commander 3 and the panel operation unit include, for example, station selection, volume adjustment, mode switching, a cursor operation, a setting operation, and a browsing operation.

An operation of this tuner apparatus 2 is described below. At first, an operation of this tuner apparatus 2 in a normal mode for viewing a broadcast is described. When a user's operation on the remote commander 3 performs a selecting operation for selecting a broadcasting station (channel), the operation information is conveyed to the CPU 20 and the CPU 20 controls the tuner 11 in response to the selecting operation. The tuner 11 selects a broadcasting station in response to selecting information sent from the CPU 20, and receives and demodulates broadcast content transmitted in a transport stream form after being modulated. If the broadcast content is a charged broadcast or the like and is encrypted (scrambled), under the control of the CPU 20, the descrambler 12 descrambles the scrambled content and the demultiplexer 13 demultiplexes multiplexed transport streams. Separated video signal and audio signal obtained by the descrambler 12 and the demultiplexer 13 are encoded. Accordingly, the video signal is decoded by the video processing circuit 15, and the audio signal is decoded by the audio processing circuit 17.

When the tuner apparatus 2 receives a data broadcast, a data broadcast signal separated by the demultiplexer 13 is transferred as a data-broadcast-screen display signal to the OSD adding circuit 18 through the CPU 20. On the basis of an image command from the CPU 20, the OSD adding circuit 18 generates a GUI (graphical user interface) video signal. The image signal is added to the video signal decoded by the video processing circuit 15, and is output to a display of the monitoring apparatus 1. Also, the decoded audio signal is output from the monitoring apparatus 1.

The user can also activate an application such as a browser by operating the remote commander 3. For example, the user uses the remote commander 3 to perform an operation for directing browser activation and termination, whereby an application is read from the memory 21 and is activated by the CPU 20. When the browser is activated, the CPU 20 uses its browsing function to perform acquiring information on the Internet through the interface 22 and displaying the acquired information for user's browsing.

When the user needs to record broadcast content, the user may perform a video recording operation by using the remote commander 3. Under the control of the CPU 20, on the basis of the video recording operation, video and audio signals of the received broadcast content are transferred to the digital recording/playback apparatus 4, which is connected to the tuner apparatus 2, through the interface 22. In response to a request of the CPU 20, the digital recording/playback apparatus 4 records the video and audio signals of the received broadcast content. When the user uses the remote commander 3 to perform a playback operation, the CPU 20 instructs the digital recording/playback apparatus 4 to perform playback, whereby playback of recorded video and content of content is executed. Data of the played-back video and audio of the content is input to the tuner apparatus 2. The input data is processed by the video processing circuit 15 and the audio processing circuit 17, and the processed data is output from the display and speaker of the monitoring apparatus 1.

The tuner apparatus 2 in FIG. 3 is an example of an information processing apparatus according to an embodiment of the present invention, and is shown as an example of an apparatus that performs an operation on the browser screen particularly in an environment having no mouse.

FIG. 4 shows an example of the configuration of operation buttons of the remote commander 3. The remote commander 3 is provided with various operation buttons (as operating elements) which are necessary for operating the tuner apparatus 2 and a connected apparatus. As shown in FIG. 4, the numerical buttons 31, the arrow buttons 32, the SET button 33, and a browser button 34 are provided as operation buttons associated with the operation (described later) of the tuner apparatus 2 in this embodiment. As the numerical buttons 31, "1" to "12" buttons are provided and function as station selecting operation buttons in the normal television broadcast receiving mode. In addition, when the tuner apparatus 2 operates as a browser, in this embodiment, all or part of the "1" to "12" buttons are assigned to the links 101 shown in FIG. 1, and serve as direct operation buttons for a link operation. As the arrow buttons 32, upward, downward, right, and left buttons are provided. The arrow buttons 32 are used for movements such as moving the cursor 100 in each given direction and moving a selected portion on a menu screen. During the operation of the browser, by using the arrow buttons 32, the cursor 100 can be sequentially moved to each of the links 101. The SET button 33 is a button for a setting operation. For example, when the cursor 100 is positioned at one link 101, by pressing the SET button 33, link processing can be executed as a set operation. The SET button 33 is also used as an operation button for each of various setting operations on the menu screen or a user interface screen. The browser button 34 is an operation button for instructing the browser to switch on and off a browsing function.

Next, FIG. 5 shows the configuration of software for the browsing function of the CPU 20. As shown in FIG. 5, the software includes a Window system/graphics processor 41, an input processor 42, a JavaScript Engine 43, an image decoder 44, an HTTP (hypertext transport protocol) 45, a network unit 46, a renderer 47, a layouter 48, a parser 49. When the interface 22 in FIG. 3 connects the tuner apparatus 2 to the network 5, the HTTP 45 performs protocol processing on data acquired by the network unit 46 in FIG. 5, and the parser 49 analyzes the acquired data. On the basis of the result of the analysis, a layout of the links 101 is determined, and the renderer 47 uses the Window system/graphics processor 41 to perform display control. A user's operation is processed through the input processor 42. Processing (described later) concerning the link operation in this embodiment is realized by the input processor 42 while it cooperates with the renderer 47 and the layouter 48. In the following description, in the layouter 48, each link is stored as a polygon surrounding the link.

3. Structure for Assignment

As described with reference to FIG. 1, in this embodiment, the numerical buttons 31 are dynamically assigned to the links 101 included in data displayed on the screen. When an operation is performed on an assigned numerical button 31, link processing is performed in response to the operation. The buttons assigned to the links 101 are not limited to the numerical buttons 31 on the remote commander 3, and may be determined depending on the system. However, the following description is based on the assignment of the numerical buttons 31.

FIGS. 6A and 6B schematically show pointer structures of the "1" to "12" buttons of the numerical buttons 31. These structures are internal data structures representing a button layout and are used in algorithm processing (described later). The twelve structures shown in FIG. 6A represent the "1" to "12" buttons, respectively. Each structure is divided into nine portions, and the central portions indicate numerals of the numerical buttons 31. The structure includes pointers to other buttons around the structure. Specifically, eight surrounding squares around the center of the nine divided portions are used as pointers to eight surrounding buttons around the structure. Pointer names for use in the processing (described later) are shown in FIG. 6B. As shown in FIG. 6B, an upward pointer (indicated by "UP"), a downward pointer (indicated by "DOWN"), a left pointer, and a right pointer are set as pointers to upward, downward, left, and right buttons. Also, regarding pointers to obliquely positioned buttons, an obliquely right upward pointer is called a "P1 pointer", an obliquely left upward pointer is called a "P2 pointer", an obliquely left downward pointer is called a "P3 pointer", and an obliquely right downward pointer is called a "P4 pointer".

FIG. 6A shows buttons denoted by the pointers from the "5" button. In a view from the "5" button, the upward pointer points to the "2" button, the downward pointer points to the "8" button, the left pointer points to the "4" button, and the right pointer points to the "6" button. The P1 pointer points to the "3" button, the P2 pointer points to the "1" button, the P3 pointer points to the "7" button, and the P4 pointer points to the "9" button.

Each portion that bears a cross mark indicates that, in the button layout of the remote commander 3 in this embodiment, a button to which a link 101 is assigned does not exist in the pointer direction. In other words, no pointer exists in the cross mark portion. For example, for the "1" button, only the right, P4, and downward pointers exist, and the P1, upward, P2, left, and P3 pointers do not exist. However, when the links 101 are assigned to buttons other than the numerical buttons 31, for example, in a case such as when a button directly above the "1" button in FIG. 4 is used for assignment, the button is instructed to serve as the upward pointer of the "1" button.

In addition, for assigning the numerical buttons 31 to the links 101, an assignment-start-button pointer 80 is set. When the "5" button is set as the assignment-start-button pointer 80, the assignment of the numerical buttons 31 is performed with the "5" button as a reference. A display-on/off-button pointer 81 is used to determine an operation button for switching on and off display of the button icons 102 shown in FIG. 1. For example, when the "5" button is set as the display-on/off-button pointer 81, the "5" button can function as a display-on/off button. The numerical buttons 31 excluding the "5"

button, and other buttons other than the numerical buttons 31 may be each designated as the display-on/off-button pointer 81. Moreover, an operation button independent from the numerical buttons 31, etc., may be provided as a display-on/off button on the numerical buttons 31 of the like.

FIG. 7 shows reference axes that set up a coordinate system used in the algorithm in this embodiment. An X-axis box 211 obtained by extending along an X-axis a bounding box that surrounds a link 101 at which the cursor 100 is positioned, and a Y-axis box 210 obtained by extending the bounding box along a Y-axis are used as reference axes.

Figure 8:
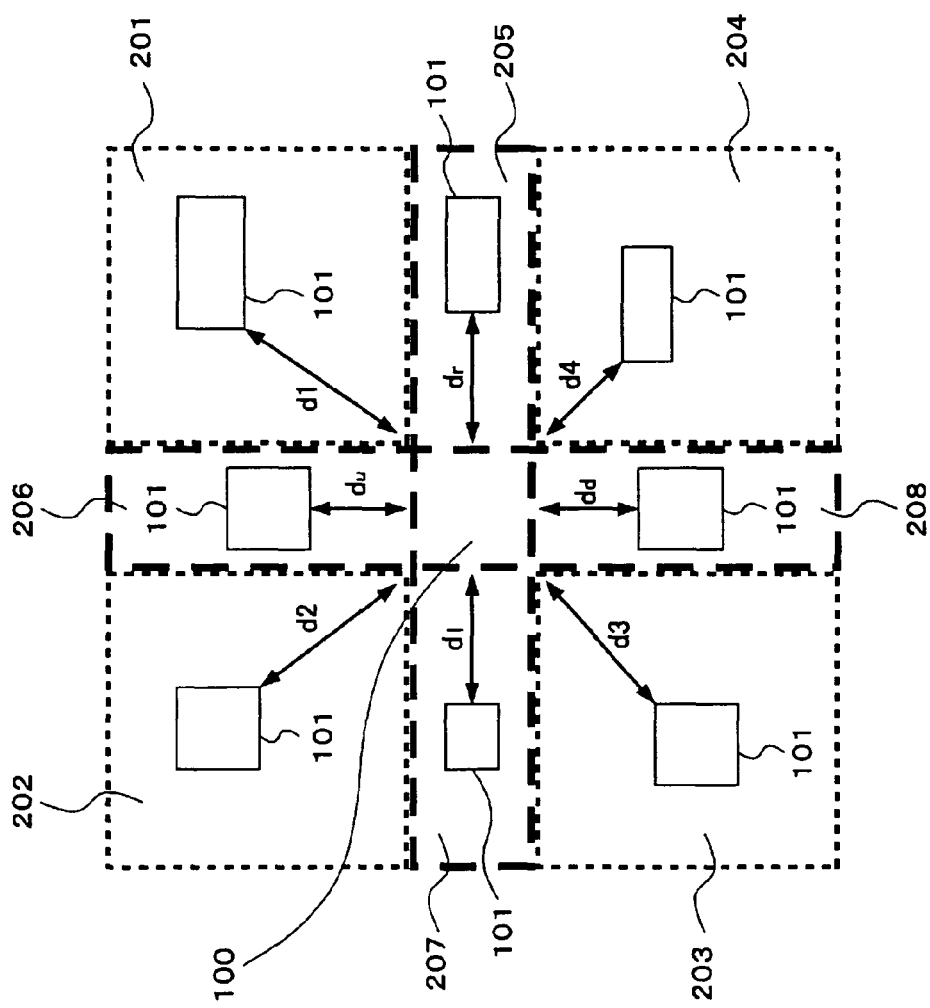
FIG. 8 is an illustration of a coordinate system for use in the assigning process in the embodiment of the present invention.

FIG. 8 shows a coordinate system used for link assignment to buttons. As shown in FIG. 8, coordinate regions around the position of the cursor 100 include a right box 205, an upward box 206, a left box 207, a downward box 208, a first quadrant 201, a second quadrant 202, a third quadrant 203, and a fourth quadrant 204. Distances d1, d2, d3, d4, dd, du, dr, and dl are defined as distances between links 101 positioned in the boxes and the position of the cursor 100. For example, distance d1 represents the distance between the link 101 in the first quadrant 201 and the cursor 100.

4. Browsing

Characteristic processing in this embodiment, that is, processing (described with reference to FIG. 1) for the direct operation on the link, is described below. At first, a main process of the CPU 20 as a browsing function is described.

Figure 9:
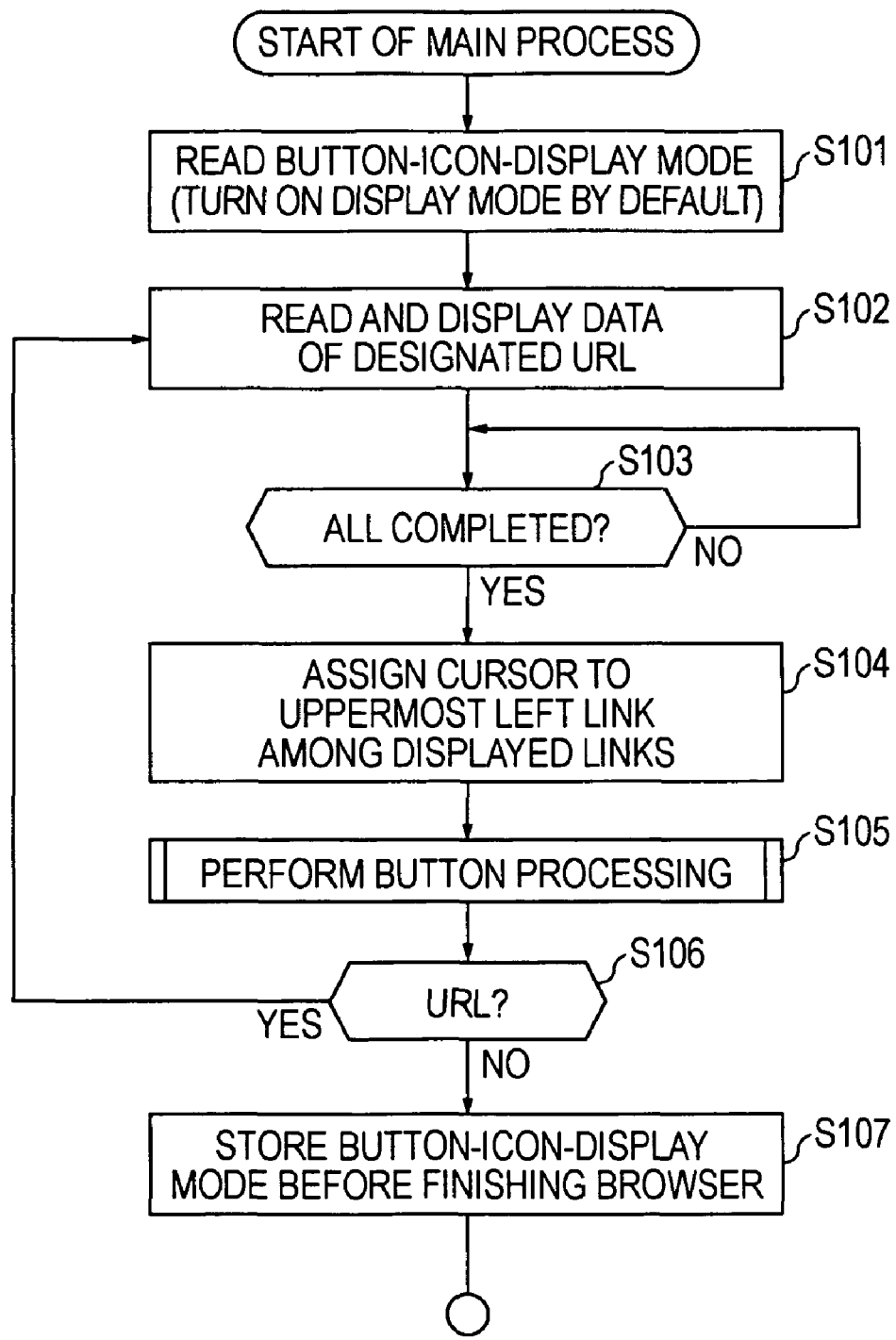
FIG. 9 is a flowchart showing a main process of the browsing function in an embodiment of the present invention.

The main process shown in FIG. 9 is executed after the CPU 20 starts the browser in response to user's pressing the browser button 34. In step S101, a button-icon-display mode stored at previous termination of the browser is read. In other words, it is confirmed in which of on and off states the button-icon-display mode is. If the button-icon-display mode is not set, the button-icon-display mode is turned on by default. In step S102, data concerning a designated URL is read by communication via the network 5 and is displayed on the monitoring apparatus 1. In step S103, the CPU 20 awaits completion of display of the URL data. If the display of the URL data is completed, the process proceeds to step S104, and the cursor 100 is assigned to the uppermost left link 101 among the links 101 displayed on the screen of the monitoring apparatus 1. Data acquired by accessing a URL is not entirely displayed within the screen at all times. In many cases, due to data size and screen size, part of the data is displayed. In step S104, the CPU 20 positions the cursor 100 at the uppermost left link 101, as one of the links 101 displayed on the screen, as much as possible. When no link 101 exists in the data, and when a link 101 is not displayed (outside the screen) even if it exists, the cursor 100 is not displayed that time. In these cases, the cursor 100 may be displayed at positions other that the positions of the links 101, such as an upper left position on the screen.

Figure 10:
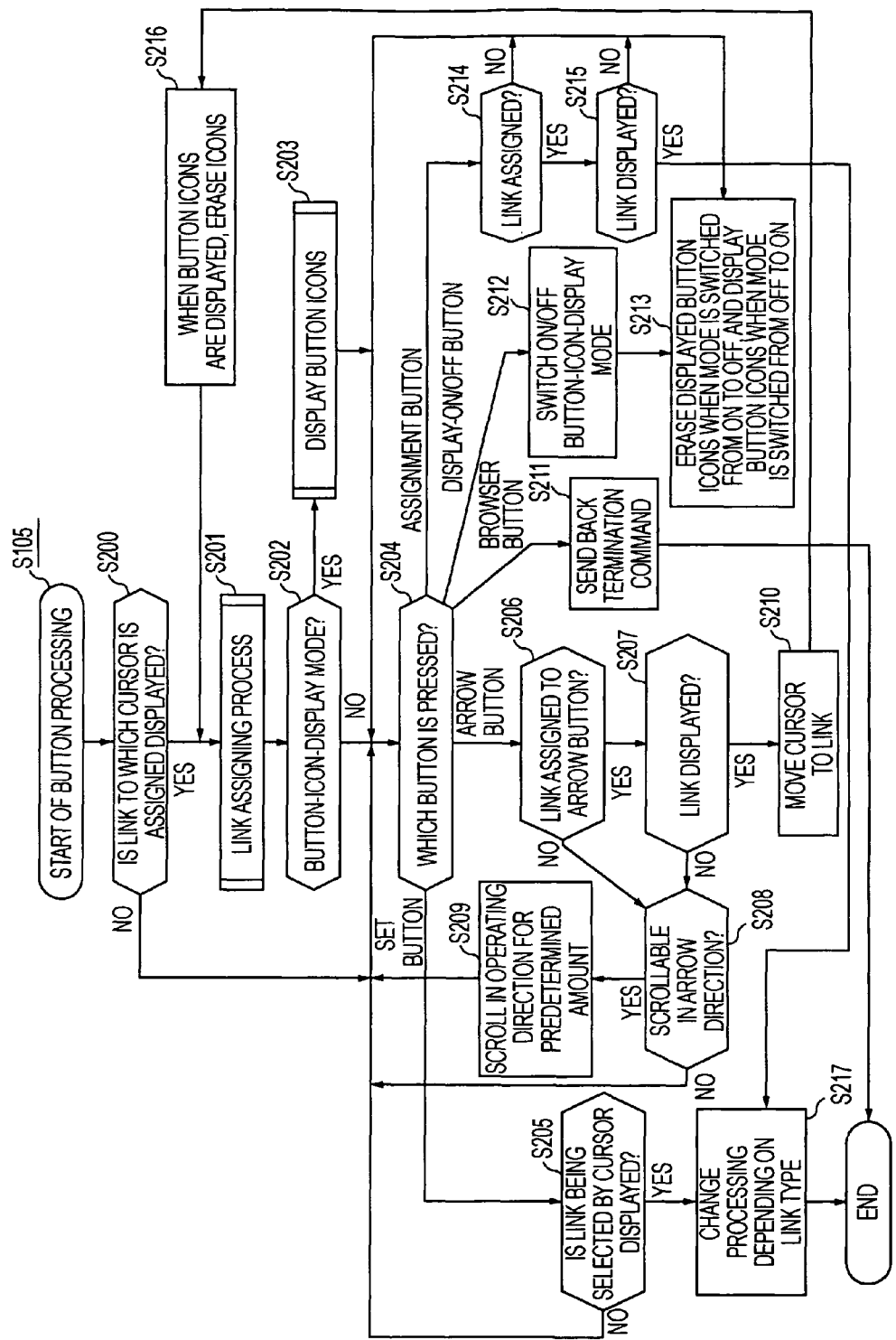
FIG. 10 is a flowchart showing a button process in an embodiment of the present invention.

After that, proceeding to step S105, the button processing (described later) shown in FIG. 10 is performed. As the result of the button processing, a different URL or a browser termination command is sent back. If a URL is sent back as the result of the button processing, the process returns from step S106 to S102, and the CPU 20 executes reading and displaying data of the URL. Alternatively, if a browser termination command is sent back as the result of the button processing, the process proceeds to step S107, and the button-icon-display mode at the time is stored before the browser is finished.

The button processing in step S105 is described below with reference to FIGS. 10 to 24. FIG. 10 shows details of the button processing in step S105, and is a flowchart mainly including button assigning processing and processing for button input from the user.

In step S200, the CPU 20 checks whether, on the displayed data, there is a link to which the cursor 100 is assigned. In other words, it is checked whether the cursor 100 is positioned at one link 101. In step S104 in FIG. 9, the cursor 100 is assigned to the uppermost left link 101 within the screen. However, the link 101 may not exist, and, when a link 101 is outside the screen, at the time in step S200, the cursor 100 is not positioned at the link 101. As described above, when the cursor 100 is not positioned at the link 101, the checking in step S200 produces a negative result, and the CPU 20 proceeds to step-S204. In step S204, the CPU 20 waits for the user to input an operation.

When the cursor 100 is positioned at one link 101 within the display screen, the CPU 20 proceeds from step S200 to step S201. In step S201, a process is performed in which, by using the link 101 at which the cursor 100 is presently positioned, other links are assigned to buttons (the numerical buttons 31 in this embodiment) for use in user's operations. In step S201, each link on the screen is assigned to one of the numerical buttons 31. As described with reference to, for example, FIG. 1, when the cursor 100 is positioned at the link 101 for "views", it is determined that the "1", "3", "7", "9", and "8" buttons are assigned to "VCRs", "recording", "HDDs", "DVRS", "reservation", respectively.

Figure 11:
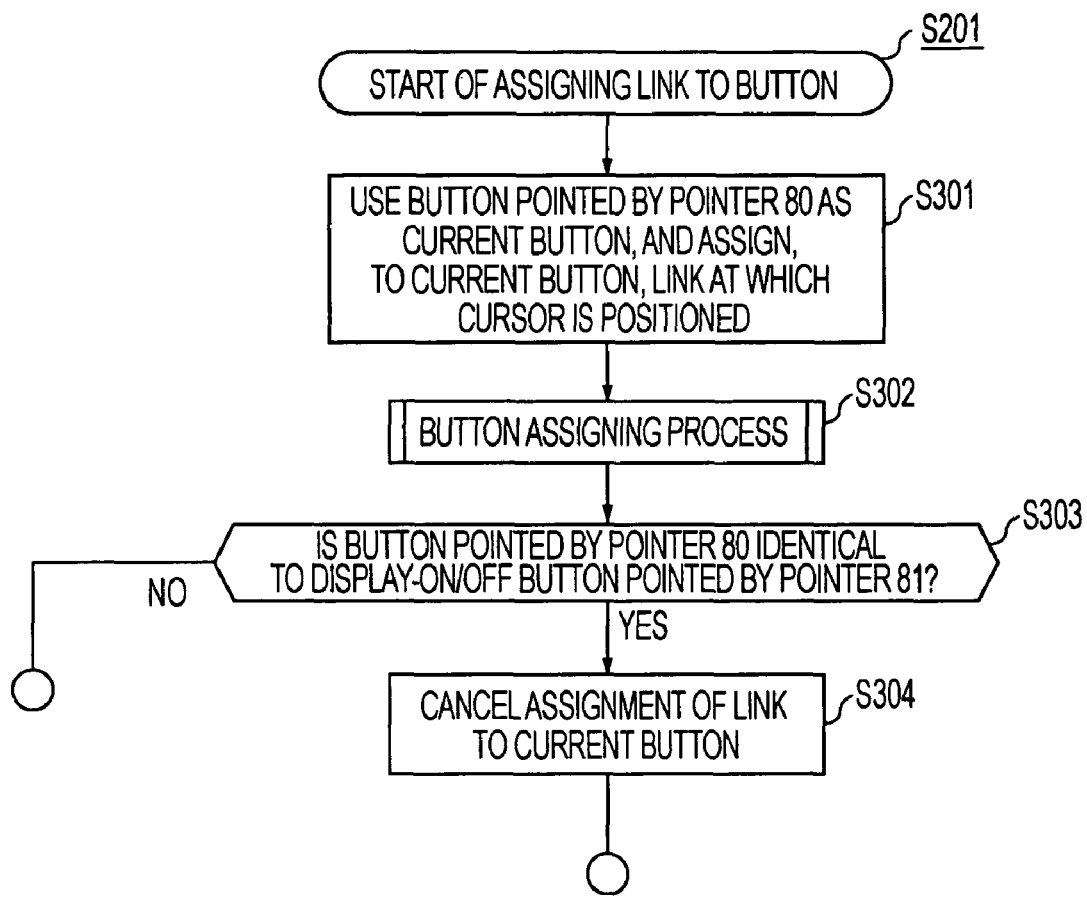
FIG. 11 is a flowchart showing a link assigning process in the embodiment of the present invention.

The link assigning process in step S201 is fully described with reference to FIGS. 11 to 18. FIG. 11 shows the link assigning process in step S201. In step S301, a button pointed to by the assignment-start-button pointer 80 described with reference to FIG. 6 is used as a current button, and the link at which the cursor 100 is presently positioned is assigned to the current button. For example, when the assignment-start-button pointer 80 represents the "5" button and the cursor 100 is positioned at the link 101 for "views" as shown in FIG. 1, the "5" button is assigned to the link 101 for "views". After that, the CPU 20 proceeds to step S302 and performs the button assigning process shown in FIG. 12. For example, the links 101 on the screen become assigned to buttons around the "5" button.

After the button assigning process finishes, in step S303, processing is branched off depending on whether a button represented by the display-on/off-button pointer 81 shown in FIG. 6 is identical to the button represented by the assignment-start-button pointer 80. If both buttons differ, the process shown in FIG. 11, that is, step S201 in FIG. 10, is finished. If both are identical, in step S304, the assignment of the link to the button is canceled before the process in FIG. 11 is finished. For example, in FIG. 6, each of the display-on/off-button pointer 81 and the assignment-start-button pointer 80 represents the "5" button. In this case, the link assignment to the "5" button is canceled. Accordingly, the "5" button functions as a display-on/off button. If the display-on/off-button pointer 81 designates a button other than the numerical buttons 31, it is unnecessary to cancel the link assignment to the "5" button. In addition, when the display-on/off-button pointer 81 is not particularly used, and the display-on/off button is provided as a dedicated button, steps S303 and S304 are unnecessary.

Figure 12:
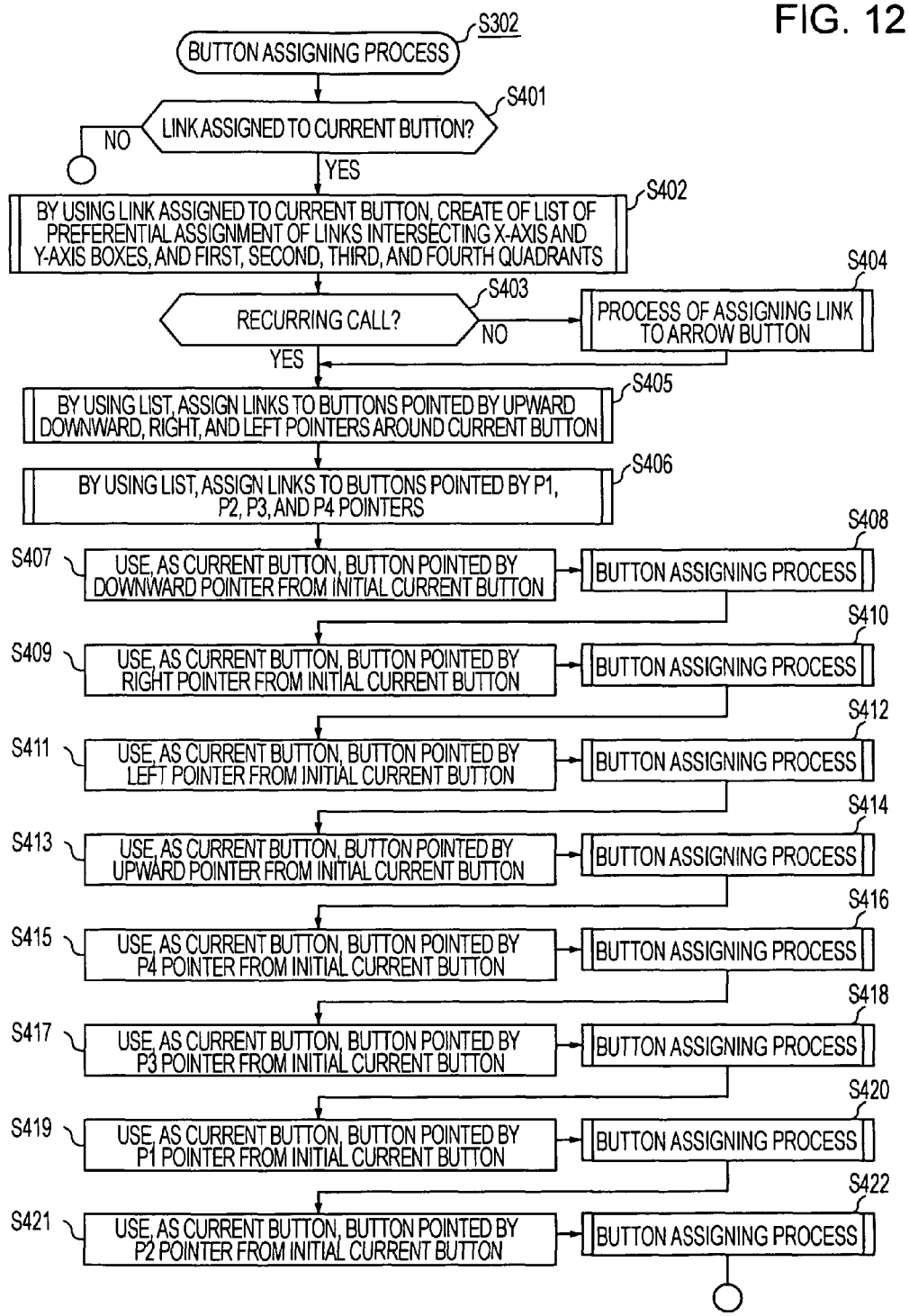
FIG. 12 is a flowchart showing a button assigning process in the embodiment of the present invention.

The button assigning process in step S303 is shown in FIG. 12. In this process in FIG. 12, in step S401, it is checked whether a link 101 is assigned to the current button. When the link 101 is not assigned, the button assigning process directly finishes. If the link 101 is assigned, the process proceeds to step S402, and, by using the link 101, a list of preferential assignment of links 101 intersecting the X-axis box 211, the Y-axis box 210, the first quadrant 201, the second quadrant 202, the third quadrant 203, and the fourth quadrant 204 is created.

Figure 13:
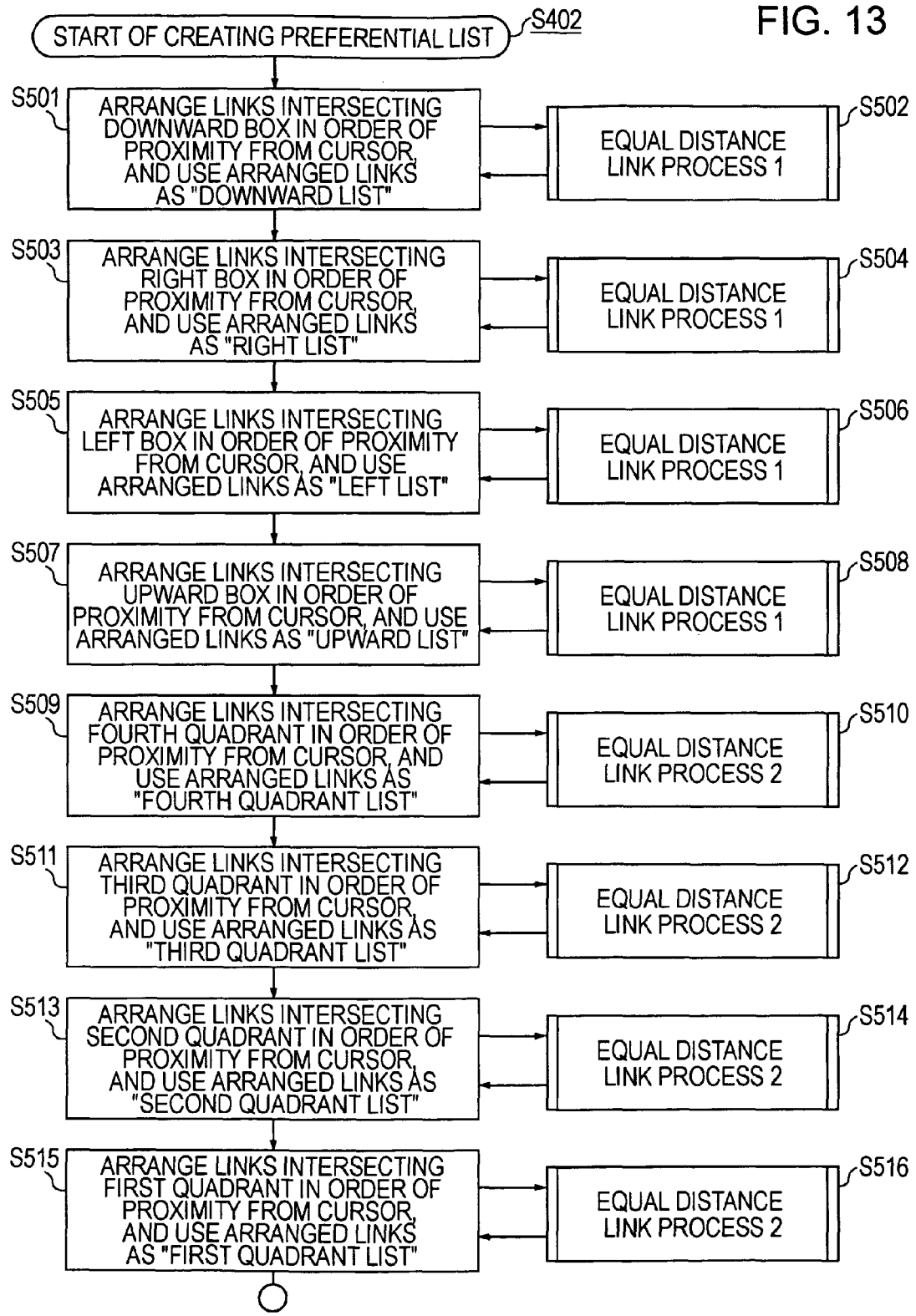
FIG. 13 is a flowchart showing a preferential assignment list in the embodiment of the present invention.

The creating of the preferential assignment list in step S402 is shown in FIG. 13. The preferential assignment list is created in each of the downward box 208, the right box 205, the upward box 206, the left box 207, the first quadrant 201, the second quadrant 202, the fourth quadrant 204, and the fourth quadrant 204.

In step S501, by using distance dd defined with reference to FIG. 8 to arrange the links 101 intersecting the downward box 208 in order of proximity to the cursor 100, a "downward list" is formed. In other words, an arrangement of one or more links 101 positioned in the downward box 208, with the position of the cursor 100 as a reference, is the downward list. When there are links 101 positioned in the downward box 208 which have equal distances dd, in step S502, order of priority of such links 101 is determined in "equal distance link process 1", and they are included in the list.

In step S503, by using distance dr defined with reference to FIG. 8 to arrange links 101 intersecting the right box 205 in order of proximity to the cursor 100, a "right" is formed. When there are links 101 which have equal distances dr, in step S504, order of priority of such links 101 is determined in the "equal distance link process 1". In step S505, by using dl defined with reference to FIG. 8 to arrange links 101 intersecting the left box 207 in order of proximity to the cursor 100, a "left" list is formed. When there are links 101 which have equal distances dl, in step S506, order of priority of such links 101 is determined in the "equal distance link process 1". In step S507, by using distance du defined with reference to FIG. 8 to arrange links 101 intersecting the upward box 206 in order of proximity to the cursor 100, an "upward list" is formed. When there are links 101 which have equal distances du, in step S508, order of priority of such links 101 is determined in the "equal distance link process 1".

Figure 14:
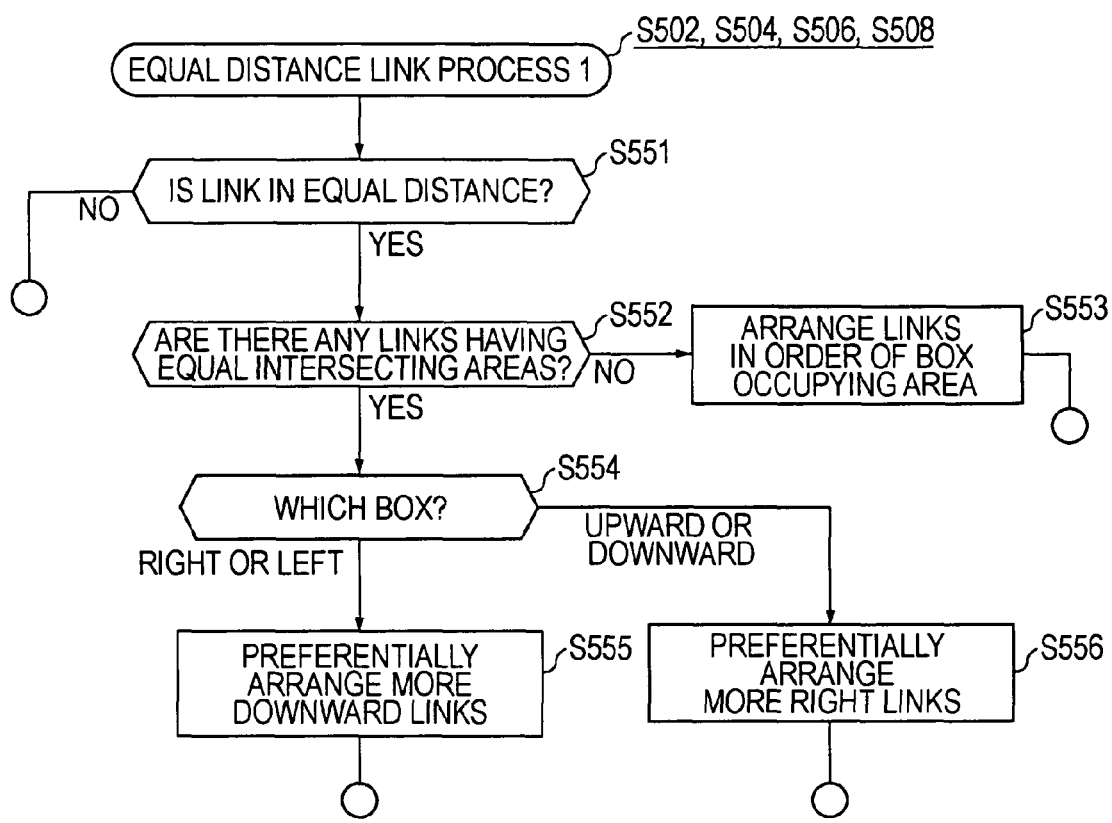
FIG. 14 is a flowchart showing equal distance link process 1 in the embodiment of the present invention.

The "equal distance link process 1" in each of steps S502, S504, S506, and S508 is shown in FIG. 14. In step S551, it is determined whether, in an object box (e.g., the downward box 208 in step S502) subject to present processing, there are links 101 having equal distances (distance dd in the case of the downward box 208). If there are the links 101 having equal distances, the process proceeds to step S552, and areas in which the links 101 intersect the object box are compared. As described above, each link 101 is stored in the layouter 48 in FIG. 5 in the form of a polygon surrounding the link portion. In this case, overlapping areas in which polygons as the links 101 overlap the object box are calculated and compared. If there are not any links 101 having equal overlapping areas with the object box, the process proceeds to step S553, and the links 101 are included in the list in order of area occupying the object box. If, in step S552, it is determined that intersecting areas of plural links 101 are equal, the process proceeds to step S554, and the process is branched off depending on the object box. In other words, the object box in the case of processing in step S502 is the downward box 208. Thus, the process proceeds to step S556. In step S556, among a plurality of links 101 having equal distances dd and equal occupying areas in the downward box 208, more right links are preferentially included in the downward list. In the case of processing in step S504, the object box is the right box 205. Thus, the process proceeds to step S555. In step S555, among a plurality of links 101 having equal distances dr and equal occupying areas in the right box 205, more downward links are preferentially included in the right list. In the case of processing in step S506, the object box is the left box 207.

Thus, the process proceeds to step S555. In step S555, among a plurality of links 101 having equal distance dl and equal occupying areas in the left box 207, more downward links are preferentially included in the left list. In the case of processing in step S508, the object box is the upward box 206. Thus, the process proceeds to step S556. In step S556, among a plurality of links 101 having equal distances du and equal occupying areas in the upward box 206, more upward links are preferentially included in the upward list.

As described above, steps S501 to S508 in FIG. 13 are performed to create the downward, right, left, and upward lists. In each list, the links 101 in the object box are prioritized in order of proximity to the cursor 100. In addition, links 101 having equal distances are prioritized in order of occupying area in the object box. In a case in which links 101 have equal distances and occupying areas, for the right box 205 and the left box 207, more downwardly positioned links are prioritized, and, for the downward box 208 and the upward box 206, more right positioned links are prioritized.

Next, the process proceeds to step S509. In step S509 and the subsequent steps, preferential arrangement lists of links 101 are created for the first quadrant 201, the second quadrant 202, the third quadrant 203, and the fourth quadrant 204.

In step S509, by using distance d4 defined with reference to FIG. 8 to arrange links 101 intersecting the fourth quadrant 204 in order of proximity to the cursor 100, a "fourth quadrant list" is formed. If there are links 101 having equal distances d4, in step S510, the links 101 are prioritized in "equal distance link process 2". Next, in step S511, by using distance d3 defined with reference to FIG. 8 to arrange links 101 intersecting the third quadrant 203 in order of proximity to the cursor 100, a "third quadrant list" is formed. If there are links 101 having equal distances d3, in step S512, the links 101 are prioritized in the "equal distance link process 2". In step S513, by using distance d2 defined with reference to FIG. 8 to arrange links 101 intersecting the second quadrant 202 in order of proximity to the cursor 100, a "second quadrant list" is formed. If there are links 101 having equal distances d2, in step S514, the links 101 are prioritized in the "equal distance link process 2". In step S515, by using distance d1 defined with reference to FIG. 8 to arrange links 101 intersecting the first quadrant 201 in order of proximity to the cursor 100, a "first quadrant list" is formed. If there are links 101 having equal distances D1, in step S516, the links 101 are prioritized in the "equal distance link process 2".

Figure 15:
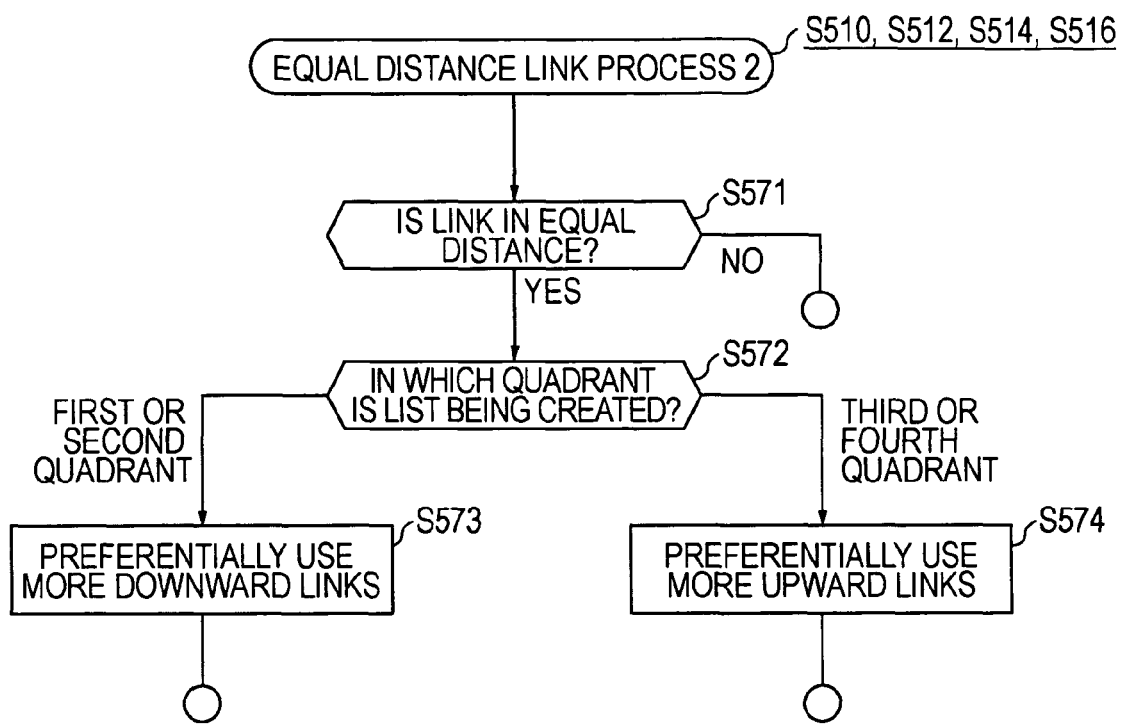
FIG. 15 is a flowchart showing equal distance link process 2 in the embodiment of the present invention.

The "equal distance link process 2" in each of steps S510, S512, S514, and S516 is shown in FIG. 15. In step S571, it is determined whether, in an object box (e.g., the fourth quadrant 204 in step S510) subject to present processing, there are links 101 having equal distances (distance d4 in the case of the fourth quadrant 204). If there are the links 101 having equal distances, the process proceeds to step S572, and the process is branched off depending on the object box. In other words, in the case of processing in step S510, the object box is the fourth quadrant 204. Thus, the process proceeds to step S574, and, among a plurality of links 101 having equal distances d4, more upwardly positioned links are preferentially included in the fourth quadrant list. In the case of processing in step S512, the object box is the third quadrant 203. Thus, the process proceeds to step S574, and, among a plurality of links 101 having equal distances d3, more upwardly positioned links are preferentially included in the third quadrant list. In the case of processing in step S514, the object box is the second quadrant 202. Thus, the process proceeds to step S573, and, among a plurality of links 101 having equal distances d2, more downwardly positioned links are preferentially included in the second quadrant list. In the case of processing in step S516, the object box is the first quadrant 201. Thus, the process proceeds to step S573, and, among a links 101 having equal distances d1, more downwardly positioned links are preferentially included in the first quadrant list.

The above-described steps S509 to S516 in FIG. 13 create the first quadrant 201, the second quadrant 202, the third quadrant 203, and the fourth quadrant 204. In each list, the links 101 in the object box (quadrant) are prioritized in order of proximity to the cursor 100. In a case in which links 101 have equal distances, for the third quadrant 203 and the fourth quadrant 204, more upwardly positioned links are prioritized, and, for the first quadrant 201 and the second quadrant 202, more downwardly positioned links are prioritized.

As step S402 in FIG. 12, the above-described processes in FIGS. 13, 14, and 15 are performed to create eight preferential arrangement lists, that is., the downward, right, left, upward, first quadrant, second quadrant, third quadrant, and fourth quadrant lists. After that, the process in FIG. 12 proceeds to step S403. In step S403, it is determined whether a recurring call has been made. Since an initial call is not the recurring call, the process proceeds to step S404, and link assignment to the arrow buttons 32 in FIG. 4 is performed.

Figure 16:
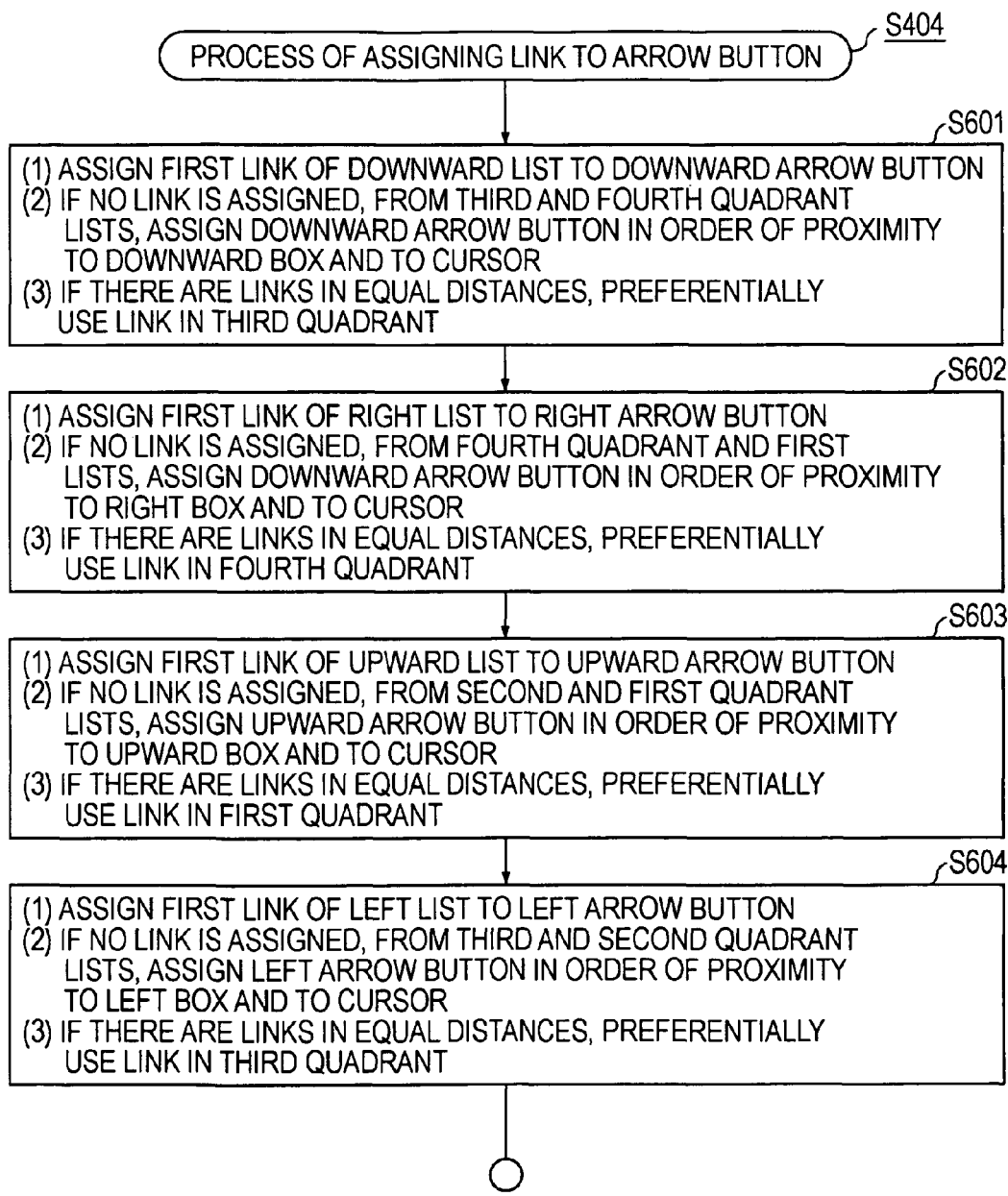
FIG. 16 is a flowchart showing a link assigning process for arrow buttons in the embodiment of the present invention.

A process in step S404 of assigning each link to each of the arrow buttons 32 is shown in FIG. 16. In step S601, a first link 101 is assigned to the downward arrow button. If no link is assigned, that is, when no link 101 exists in the downward list, from the third and fourth quadrant lists, each link 101 is assigned to the downward arrow button in order of proximity to the downward box 208 and to the cursor 100. If there are links 101 having equal distances, those in the third quadrant 203 are preferentially assigned. In step S602, a first link of the right list is assigned to the right arrow button. If no link is assigned, from the fourth and first quadrant lists, each link 101 is assigned to the right arrow button in order of proximity to the right box 205 and to the cursor 100. If there are links 101 having equal distances, each link in the fourth quadrant 204 is preferentially assigned. In step S603, a first link 101 of the upward list is assigned to the upward arrow button. If no link is assigned, from the second and first quadrant lists, each link is assigned to the upward arrow button in order of proximity to the upward box 206 and to the cursor 100. If there are links 101 having equal distances, each link in the first quadrant 201 is preferentially assigned. In step S604, a first link of the left list is assigned to the left arrow button. If no link is assigned, from the third and second quadrant lists, each link is assigned to the left arrow button in order of proximity to the left box 207 and to the cursor 100. If there are links 101 having equal distances, each link in the third quadrant 203 is preferentially assigned.

After the link assignment to the arrow buttons 32 in the process in FIG. 16 finishes as step S404 in FIG. 12, the process proceeds to step S405. the preferential assignment lists calculated in step S404 are used to perform link assignment to buttons pointed to by the upward, downward, right, and left pointers around the current button.

Figure 17:
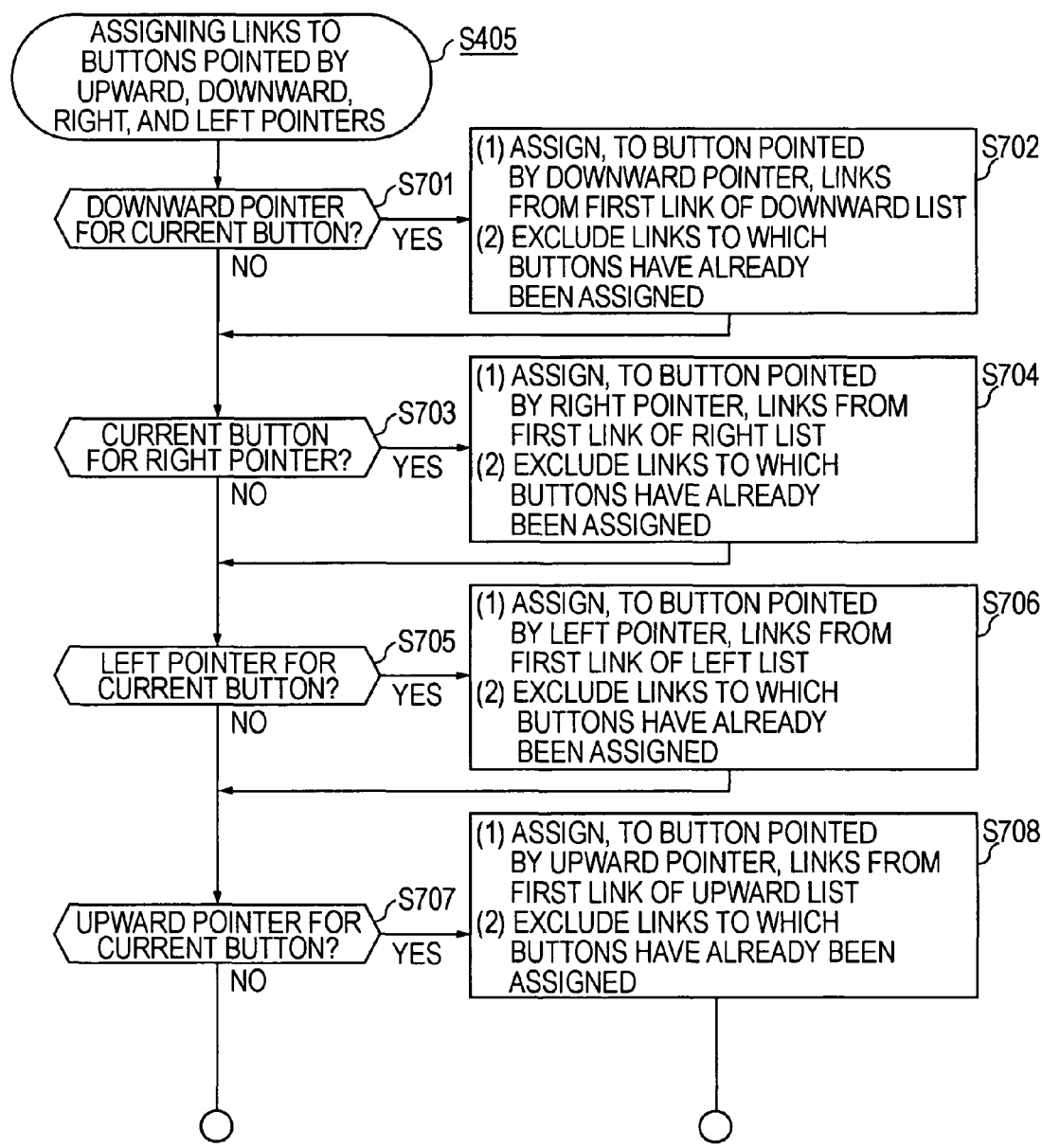
FIG. 17 is a flowchart showing assignment to buttons pointed to by upward, downward, left, and right pointers in the embodiment of the present invention.

The processing in step S404 is shown in FIG. 17. In step S701, it is checked whether or not the current button has a downward pointer. If the current button has the downward pointer, the process proceeds to step S702, the process proceeds to step S702, and each link is assigned to the downward pointer from a first link of the downward list. In this case, links to which buttons other than the arrow buttons 32 have already been assigned are excluded. After that, the process proceeds to step S703. Initially, in step S301 in FIG. 11, as the button represented by the assignment-start-button pointer 80, for example, the "5" button is used as the current button. Thus, it is checked whether the "5" button has a downward pointer.

As can be understood from FIGS. 6A and 6B, the downward pointer of the "5" button points to the "8" button. Thus, a first link 101 of the downward list is assigned to the "8" button.

In step S703, it is checked whether the current button has a right pointer. If the current button has the right pointer, the process proceeds to step S704, and links are assigned to the button pointed to by the right pointer from a first link of the right list. After that, the process proceeds to step S705. In this case, links to which buttons other than the arrow buttons 32 have already been assigned are excluded. When the current button is the "5" button, the right pointer exists as shown in FIGS. 6A and 6B, and the right pointer of the "5" button points to the "6" button. Thus, a first link 101 of the right list is assigned to the "6" button.

In step S705, it is checked whether the current button has a left pointer. If the current button has the left pointer, the process proceeds to step S706, and links are assigned to the button pointed to by the left pointer from a first link of the left list. In this case, links to which buttons other than the arrow buttons 32 have already been assigned are excluded. After that, the process proceeds to step S707. When the current button is the "5" button, the left pointer exists as shown in FIGS. 6A and 6B, and the left pointer of the "5" button points to the "4" button. Thus, a first link 101 of the left list is assigned to the "4" button.

In step S707, it is checked whether the current button has an upward pointer. If the current button has the upward pointer, the process proceeds to step S708, and links are assigned to the button pointed to by the upward pointer from a first link of the upward list. In this case, links to which buttons other than the arrow buttons 32 have already been assigned are excluded. When the current button is the "5" button, the upward pointer exists as shown in FIGS. 6A and 6B, and the upward pointer of the "5" button points to the "2" button. Thus, a first link 101 of the upward list is assigned to the "2" button.

In the processing in FIG. 17, for the "5" button as the current button, links are assigned to the "8", "6", "4", and "2" buttons. After step S405 in FIG. 12 finishes as the processing in FIG. 17, the process proceeds to step S406, and the preferential assignment lists are used to assign links 101 to buttons pointed to by the P1, P2, P3, and P4 pointers of the current button.

Figure 18:
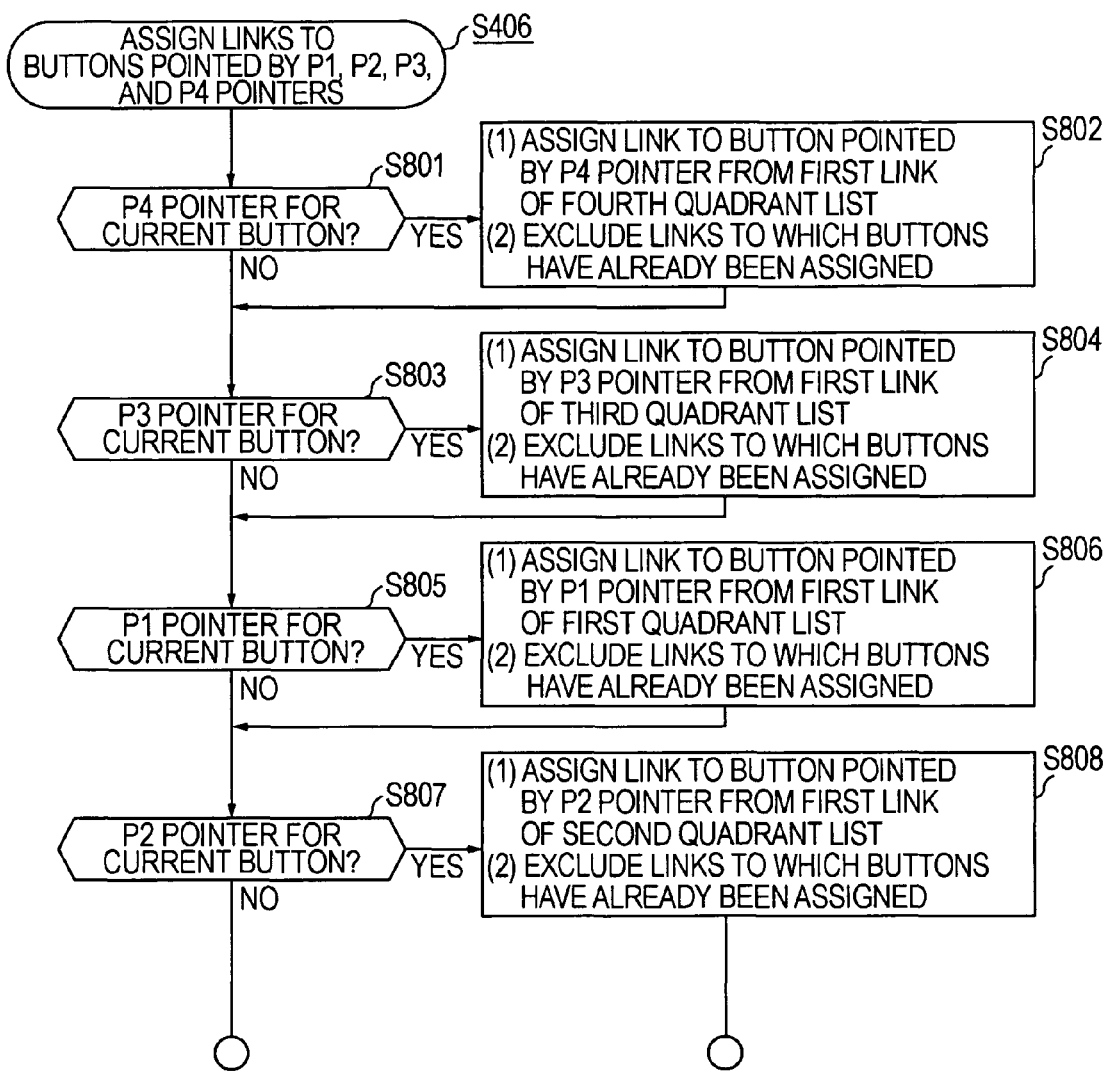
FIG. 18 is a flowchart showing assignment to buttons pointed to by P1, P2, P3, and P4 pointers in the embodiment of the present invention.

The processing in step S406 is shown in FIG. 18. In step S801, it is checked whether the current button has a P4 pointer. If the current button has the P4 pointer, the process proceeds to step S802, and links are assigned to the button pointed to by the P4 pointer from a first link of the fourth quadrant list. In this case, links to which buttons other than arrow buttons 32 have already been assigned are excluded. After that, the process proceeds to step S803. Also in this case, initially, for example, the "5" button is the current button. Accordingly, it is checked whether the "5" button has the P4 pointer. As can be understood from FIGS. 6A and 6B, the P4 pointer of the "5" button points to the "19" button. Thus, a first link 101 of the fourth quadrant list is assigned to the "9" button.

In step S803, it is checked whether the current button has the P3 pointer. If the current button has the P3 pointer, the process proceeds to step S804, and links are assigned to the button pointed to by the P3 pointer from a first link of the third quadrant list. In this case, links to which buttons other than the arrow buttons 32 have already been assigned are excluded. After that, the process proceeds to step S805. When the current button is the "5" button, the P3 pointer exists as shown in FIGS. 6A and 6B, and the P3 pointer of the "5" button points to the "7" button. Thus, a link 101 of the third quadrant list is assigned to the "7" button.

In step S805, it is checked whether the current button has the P1 pointer. If the current button has the P1 pointer, the process proceeds to step S806, and links are assigned to the button pointed by the P1 pointer from a first link of the first quadrant list. In this case, links to which buttons other than the arrow buttons 32 have already been assigned are excluded. After that, the process proceeds to step S807. When the current button is the "5" button, the P1 pointer exists as shown in FIGS. 6A and 6B, and the P1 pointer of the "5" button points to the "3" button. Thus, a first link 101 of the first quadrant list is assigned to the 11311 button.

In step S807, it is checked whether the current button has the P2 pointer. If the current button has the P2 pointer, the process proceeds to step S808, and links are assigned to the button pointed to by the P2 pointer from a first link of the second quadrant list. In this case, links to which buttons other than arrow buttons 32 have already been assigned are excluded. When the current button is the "5" button, the P2 pointer exists as shown in FIGS. 6A and 6B, and the P2 pointer of the "5" button points to the "1" button. Thus, a first link 101 of the second quadrant list is assigned to the "1" button.

In the above-described process in FIG. 18, for the "5" button as the current button, links are assigned to the "9", "7", "3", and "1" buttons.

In other words, in steps S405 (FIG. 17) and S406 (FIG. 18) in FIG. 12, link assignment to buttons pointed to by eight pointers for the current button finishes. As described above, when the current button is the "5" button, all the eight pointers exist, and assignment of links 101 to the surrounding "8", "6", "14", "2", "9", "7", "3", and "1" buttons is completed. Obviously, if no links exist in each list, no assignment is performed. For example, when no link 101 exists in the upward list, assignment of a link 101 to the "2" button is not performed.

Next, the process proceeds to step S407 in FIG. 12. In step S407 and the subsequent steps, processing that assigns links 101 to buttons around a current button is sequentially performed while switching current buttons. In step S407, the button pointed to by the downward pointer of an initial current button is used as a current button. The initial current button is the current button determined in step S301 in FIG. 11, and is a button, pointed to by the assignment-start-button pointer 80, that is, the 11511 button in the above case. In step S407, the "8" button pointed to by the downward pointer of the "5" button is used as the current button. In step S4808, in a state in which the current button is the "8" button, the button assigning process is executed as a recurring call. In this case, as processing in step S408, for a new current button (the "8" button), steps S401, S402, S403, S405, and S406 are performed (step S404 is not performed at the recurring call). In other words, the preferential assignment list is created in step S402, with the "8" button used as the current button. By using the preferential assignment list, in steps S405 and S406, links 101 are assigned to buttons, pointed to by the upward, right, left, P1, P2, P3, and P4 pointers, that is buttons around the "8" button. However, since assignment to buttons around the "5" button is performed, links are substantially assigned to the "10", "11", and "12" buttons. In addition, when no link 101 is assigned to the "8" button in initial processing with the "5" button used as the current button, that is, when no link 101 exists in the downward list, obviously, at the recurring call, a negative result is obtained in step S401, so that step S408 finishes. Thus, in this case, link assignment with the "8" button used as the current button is not performed.

In step S409, the "6" button that is pointed to by the right pointer of the "5" button as the initial current button is used as the current button. In step S410, the button assigning process is called in a recurring manner, and steps S401, S402, S403, S405, and S406 are performed, with the "6" button used as the current button. In the case of the button layout in FIGS. 6A and 6B, it is determined that the "6" button has the P1, right, and P4 pointers. In other words, at the recurring call in step S410, negative results are obtained in step S703 in FIG. 17 and steps S801 and S805 in FIG. 18.

After that, each of steps S411 to S422 in FIG. 12 is similarly performed while switching current buttons. The reason that, while switching current buttons, link assignment to buttons around each current button is performed is that button layouts vary depending on the system. For example, the button layout shown in FIGS. 4, and 6A and 6B shows an example of layout for the remote commander 3 in this embodiment. However, this does not indicate that, in all systems, the numerical buttons 31 are arranged in the form of four rows by three columns. Also, buttons other than the numerical buttons 31 may be assigned to links 101. In other words, the button assigning process is performed while switching current buttons for various operation button layouts.

Figure 26:
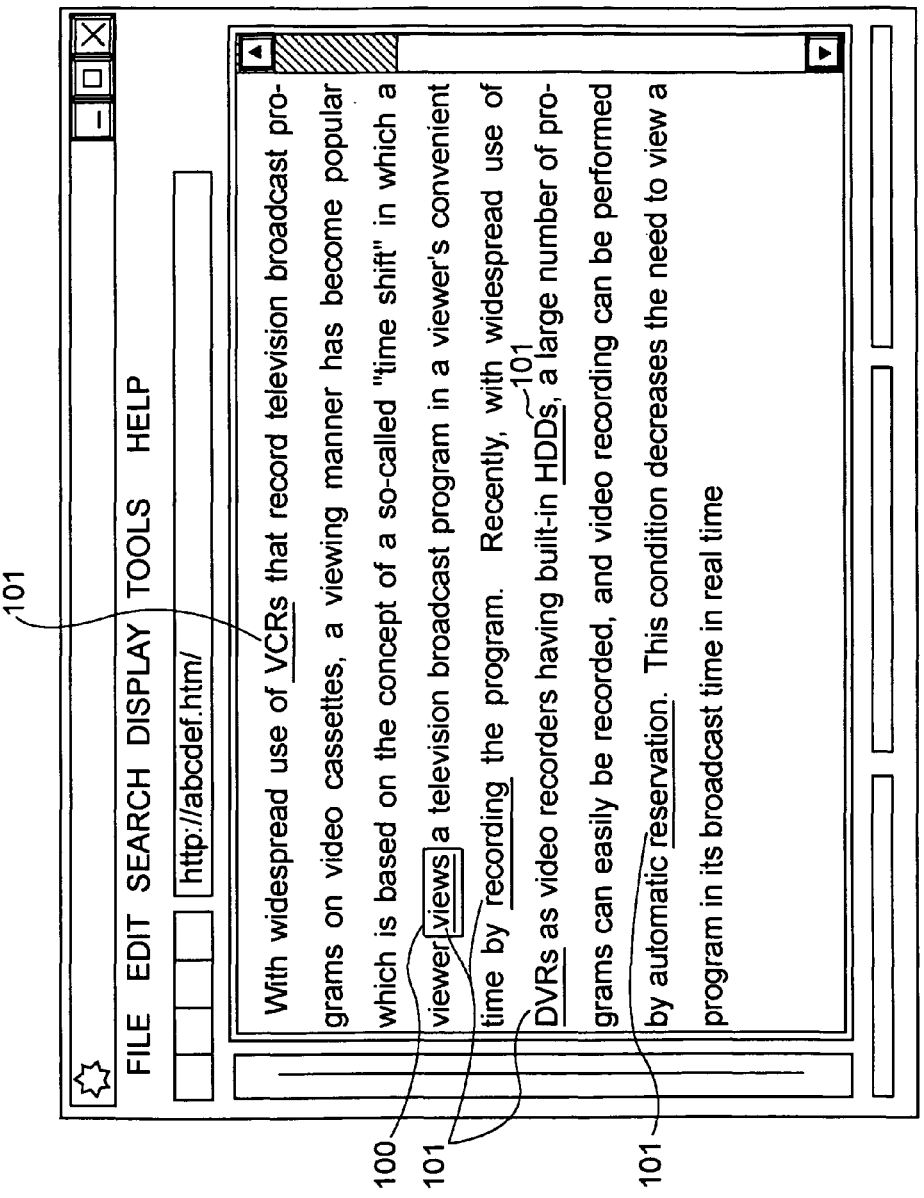
FIG. 26 is an illustration of a browser display screen.

As the above-described processes described with reference to FIGS. 11 to 18, step S201 in FIG. 10 is executed. After the link assigning process in step S201 finishes, in step S202, it is checked in which of on and off states the button-icon-display mode is. If the button-icon-display mode is off, the processing directly proceeds to step S204. In this case, the button icons 102 are not displayed, and the display state on the screen is as shown in, for example, FIG. 26. Alternatively, if the button-icon-display mode is on, in step S203, the button icons 102 are displayed, and the processing proceeds to step S204. The display state on the screen in this case is as shown in FIG. 1, and the button icons 102 are displayed adjacently to the links 101. Obviously, the button icons 102 come to indicate operation buttons to which the links 101 are assigned in step S201. For example, for the link 101 for "VCRs", a button 102 that indicates the assigned "1" button is displayed. For the link 101 for "recording" a button 102 that indicates the assigned "3" button is displayed.

Display of the button icons 102 in step S203 is described below with reference to FIGS. 19 and 20.

Figure 19:
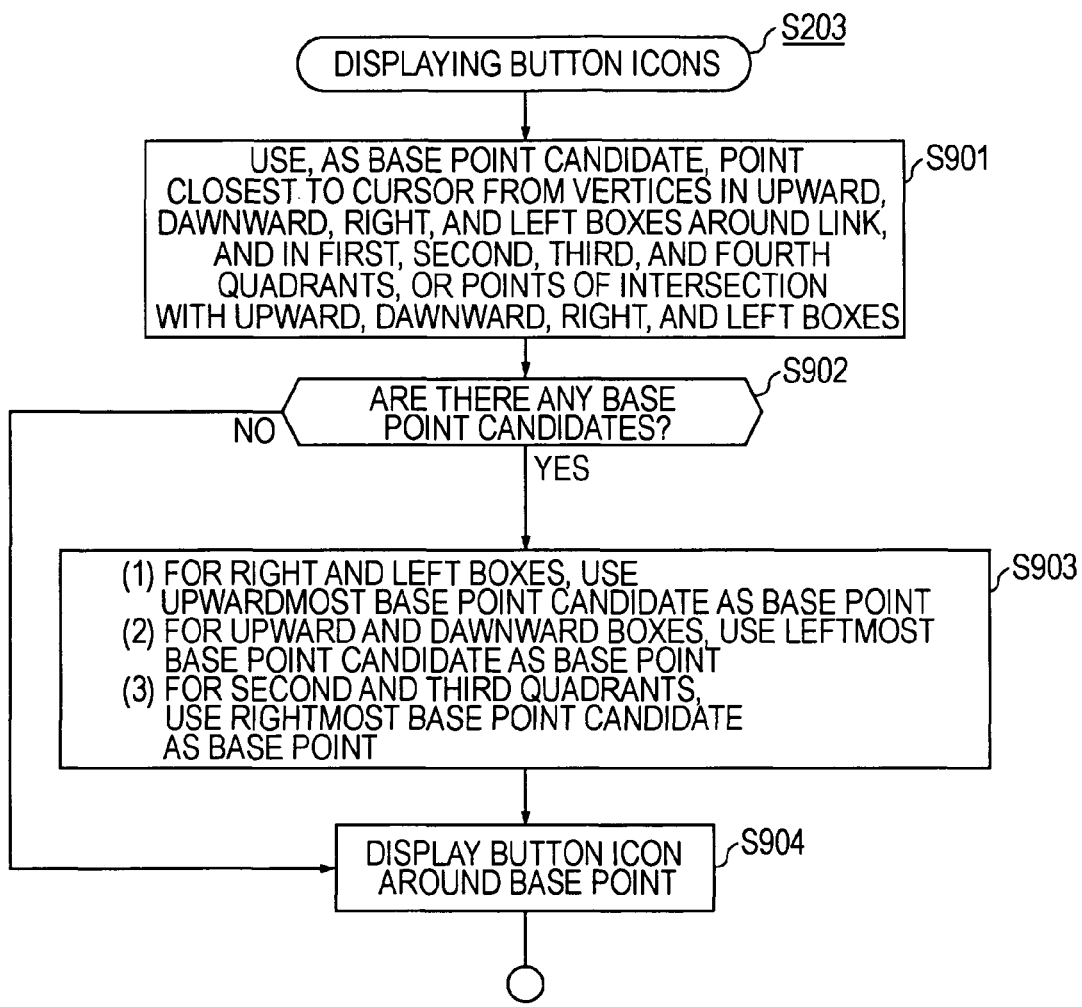
FIG. 19 is a flowchart showing a button icon display process in the embodiment of the present invention.
Figure 20:
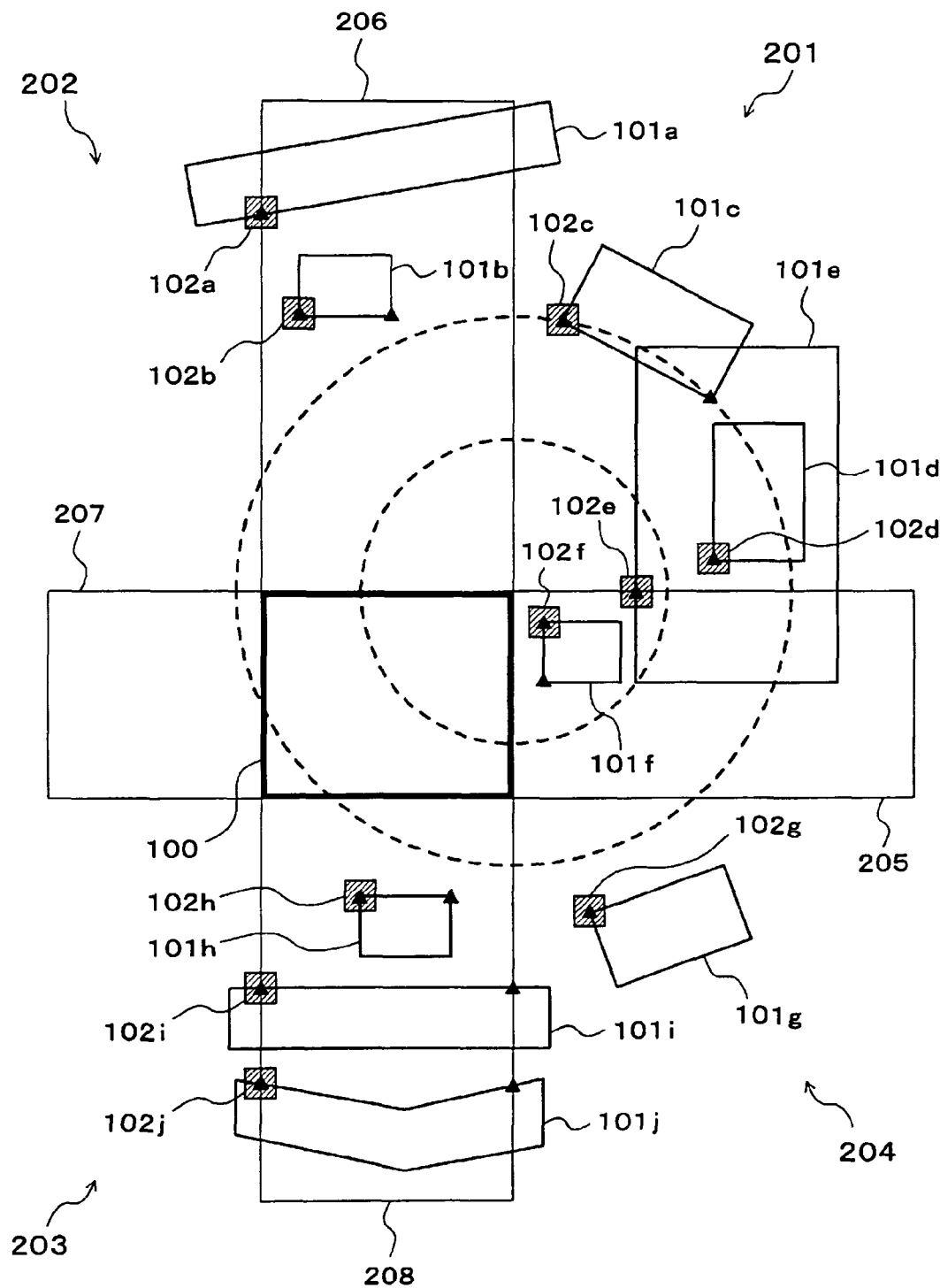
FIG. 20 is an illustration of display positions of button icons in the embodiment of the present invention.

FIG. 19 shows a process for determining the display positions of the button icons 102. By performing the process in FIG. 19 on each link 101 displayed on the screen, the button icons 102 are displayed.

In step S901, among intersecting points between one link 101 and vertices of the upward box 206, the downward box 208, the right box 205, the left box 207, the first quadrant 201, the second quadrant 202, the third quadrant 203, and the fourth quadrant 204, or the upward, downward, right, and left boxes, at least one point closest to the cursor 100 is used as a base point candidate.

In step S902, it is determined whether the number of base point candidates is plural. If the number of base point candidates is singular, the process proceeds to step S904, and the base point candidate is used as a base point without being changed. A button 102 is displayed with the base point as a reference.

If, in step S902, it is determined that the number of base point candidates is plural, the process proceeds to step S903, and, from among the base point candidates, a base point is determined.

In this case, depending on which box a link 101 is positioned in, the following determination is performed.

In the case of the right box 205 and the left box 207, among the base point candidates, an uppermost base point candidate is determined as a base point.

In the case of the upward box 206, the downward box 208, the first quadrant 201, and the fourth quadrant 204, among the base point candidates, a most left base point candidate is determined as a base point.

In the case of the second quadrant 202 and the third quadrant 203, among the base point candidates, a most right base point candidate is determined as a base point.

After base point determination is performed in the above manner, the process proceeds to step S904, and the button 102 is displayed with the base point as a reference.

Base point determination and examples of display positions of button icons 102 are described with reference to FIG. 20. FIG. 20 shows the position of the cursor 100 and links 101 (101a to 101j) around the cursor 100. Each link 101 is represented by a polygon as a link setting region in which a link is set.

The link 101a has four intersecting points with the upward box 206. An intersecting point, indicated by a black triangle (marker), closest to the cursor 100, is used as a base point, and, on the basis of the base point, a button icon 102a is displayed.

The link 101b has four vertices in the upward box 206. Two vertices, indicated by markers, closer to the cursor 100, are used as base point candidates. Since the vertices are in the upward box 206, a left base point candidate is used as a base point, and, on the basis of the base point, a button icon 102b is displayed.

The link 101c has four vertices in the first quadrant 201. Two vertices, indicated by markers, closer to the cursor 100, are used as base point candidates. In FIG. 20, a dotted line circle is additionally shown to indicate that the two vertices indicated by the markers have equal distances from the cursor 100. Since the two vertices are in the first quadrant 201, a left base point candidate is used as a base point, and, on the basis of the base point, the button icon 102c is displayed.

The link 101d has four vertices in the first quadrant 201. A vertex, indicated by a marker, closest to the cursor 100, is used as a base point. On the basis of the base point, a button icon 102d is displayed.

The link 101e has two intersecting points with the right box 205. An intersecting point, indicated by a marker, closest to the cursor 100, is used as a base point, and, on the basis of the base point, a button icon 102e is displayed.

The link 101f has four vertices in the right box 205. Two vertices, indicated by markers, closer to the cursor 100, are used as base point candidates. Since the two vertices are in the right box 205, an upper base point candidate is used as a base point, and, on the basis of the button processing, a button icon 102f is displayed.

The link 101g has four vertices in the fourth quadrant 204. A vertex, indicated by a marker, closer to the cursor 100, is used as a base point, and, on the basis of the base point, a button icon 102g is displayed.

The link 101h has four vertices in the downward box 208. Two vertices, indicated by markers, closer to the cursor 100, are used as base point candidates. Since the two vertices are in the downward box 208, a left base point candidate is used as a base point, and, on the basis of the base point, a button icon 102h is displayed.

The link 101i has four intersecting points with the downward box 208. Two vertices, indicated by markers, closer to the cursor 100, are used as base point candidates. Since the two vertices are in the downward box 208, a left base point candidate is used as a base point, and, on the basis of the base point, a button icon 102i is displayed.

The link 101j has four intersecting points with the downward box 208. Two intersecting points, indicated by markers, closer to the cursor 100, are used as base point candidates. Since the two intersecting points are in the downward box 208, a left base point candidate is used as a base point, and, on the basis of the base point, a button icon 102j is displayed.

As described in the above examples, the process in FIG. 19 determines the display positions of each button icon 102, and the button icon is displayed for each link 101.

After proceeding to step S204 in FIG. 10, the CPU 20 awaits a user's button operation. In step S204, the CPU 20 monitors operations on the SET button 33, the arrow buttons 32, the browser button 34, a display-on/off button, and an assignment button. The display-on/off button is a button designated by the display-on/off-button pointer 81 in FIG. 6. For example, the "5" button is designated. In addition, the assignment button is each button subject to the link assigning process in step S201. For example, this button is each of the numerical buttons 31. As described above, in step S201, all or part of the numerical buttons 31 are assigned In accordance with the number of links 101 and their positions.

When the operation on the SET button 33 is detected, the CPU 20 proceeds from step S204 to step S205, and confirms whether a link 101 being selected by the cursor 100 is displayed on the screen.

Figure 21:
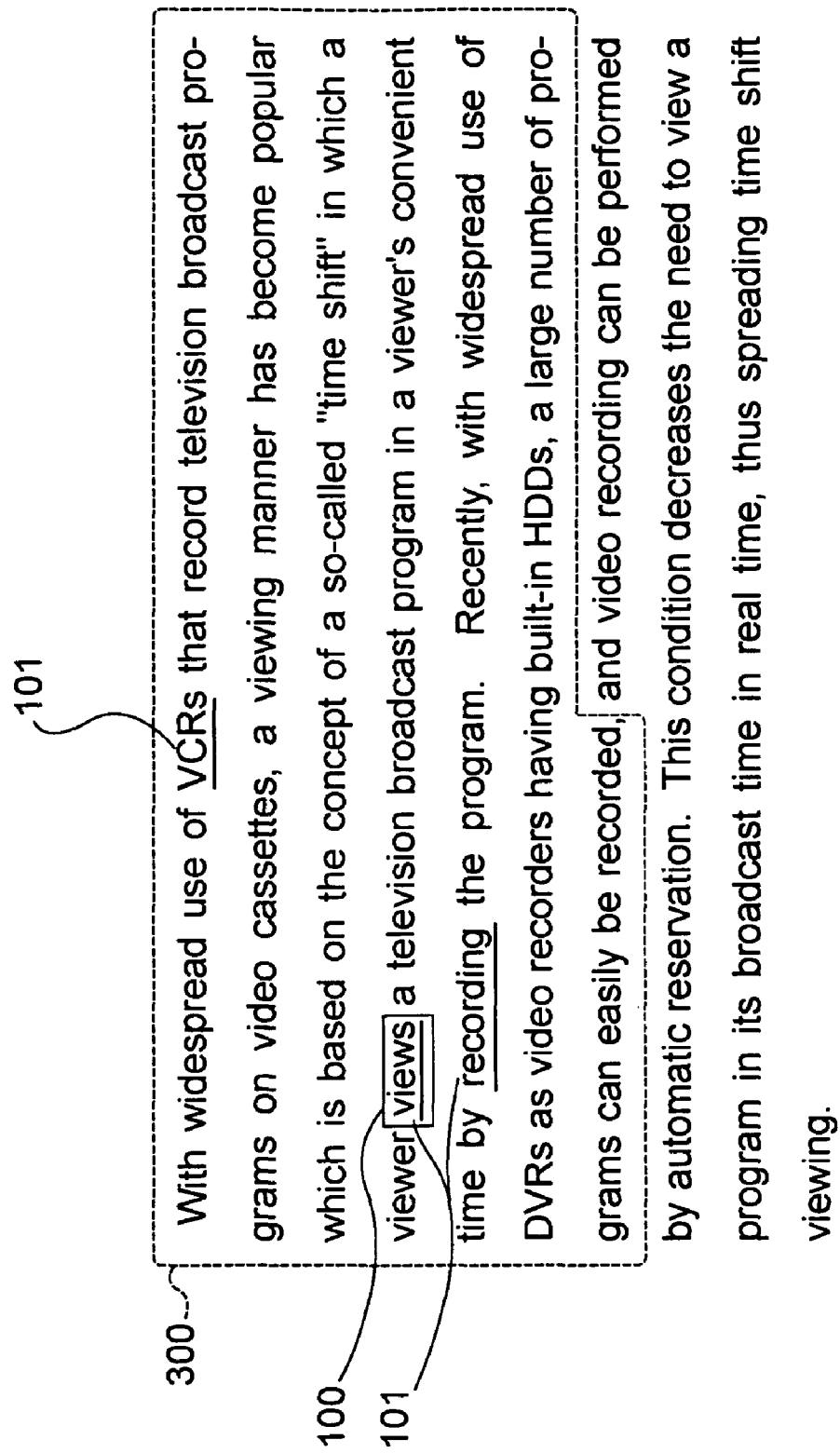
FIG. 21 is an illustration of an example of a display range of data in the embodiment of the present invention.

For example, it is assumed that data subject to display be as shown in FIG. 21. In the data, links 101 are set for three character portions "VCRs", "recording", and "views".

Figure 22:
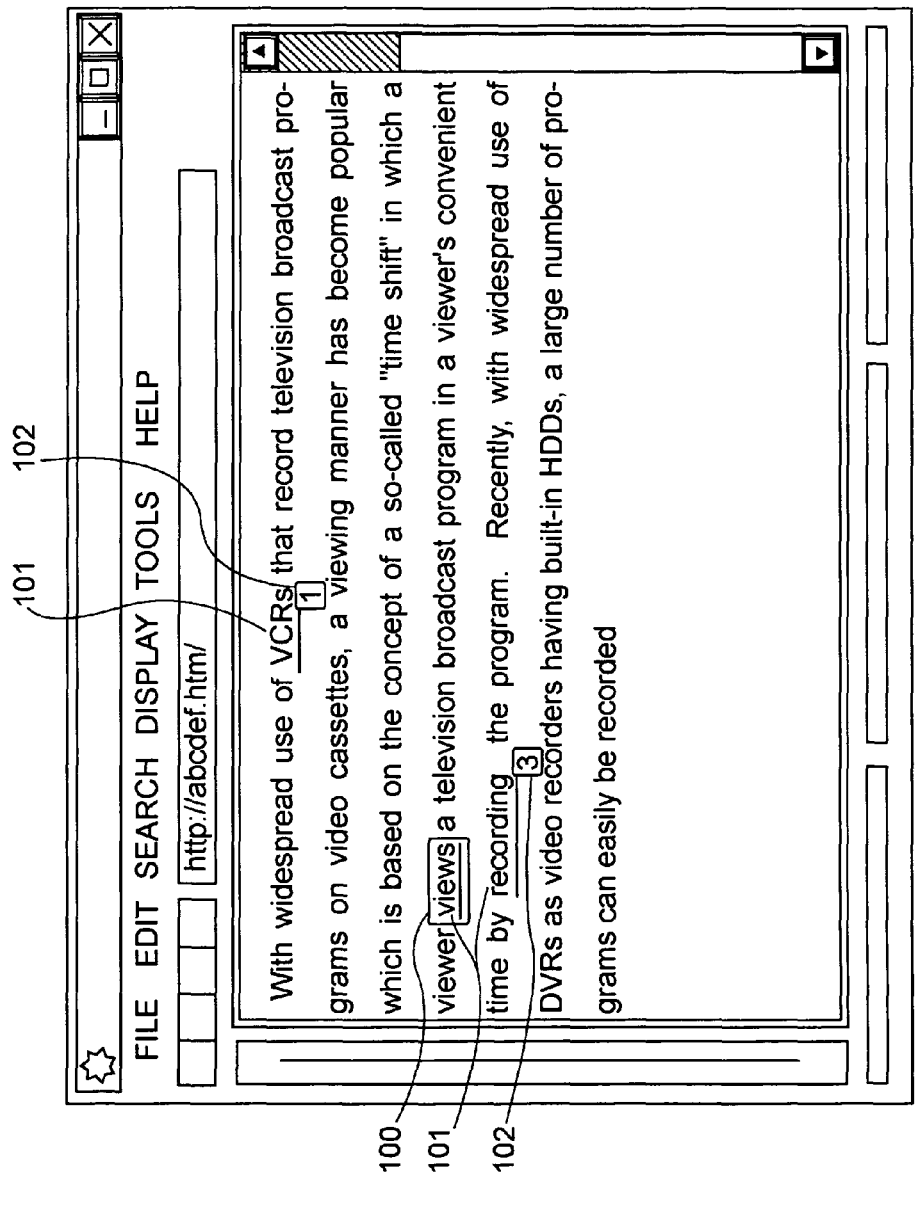
FIG. 22 is an illustration of an example of displaying data in the embodiment of the present invention.

In addition, all the data is not displayed within the screen, and the range indicated by the dotted line in FIG. 21 is a display range displayed on the screen. That is, the image on the screen is as shown in FIG. 22. The cursor 100 indicates the link 101 for "views", and, in this state, the "1" button is assigned to a link 101 for "VCRs", and the "3" button is assigned to a link 101 for "recording".

In this case, as shown in FIG. 22, the link 101 for the "views" being selected by the cursor 100 is indicated on the screen. For example, as described above, when the link 101 being selected by the cursor 100 is indicated on the screen, and the SET button 33 is operated, in step S205, it is determined that the link being selected by the cursor 100 is indicated, and the CPU 20 proceeds to step S217. In addition, processing is performed depending on the type of link, and the process finishes.

For example, when the link 101 for "views" is an URL, the URL is sent back and step S105 in FIG. 9 finishes. In this case, the CPU 20 proceeds from step S106 to step S102, and data of the URL is acquired via the network 5 and is displayed. Alternatively, when the link 101 is a link to video data, processing is performed such as activating a corresponding application and displaying video.

Figure 24:
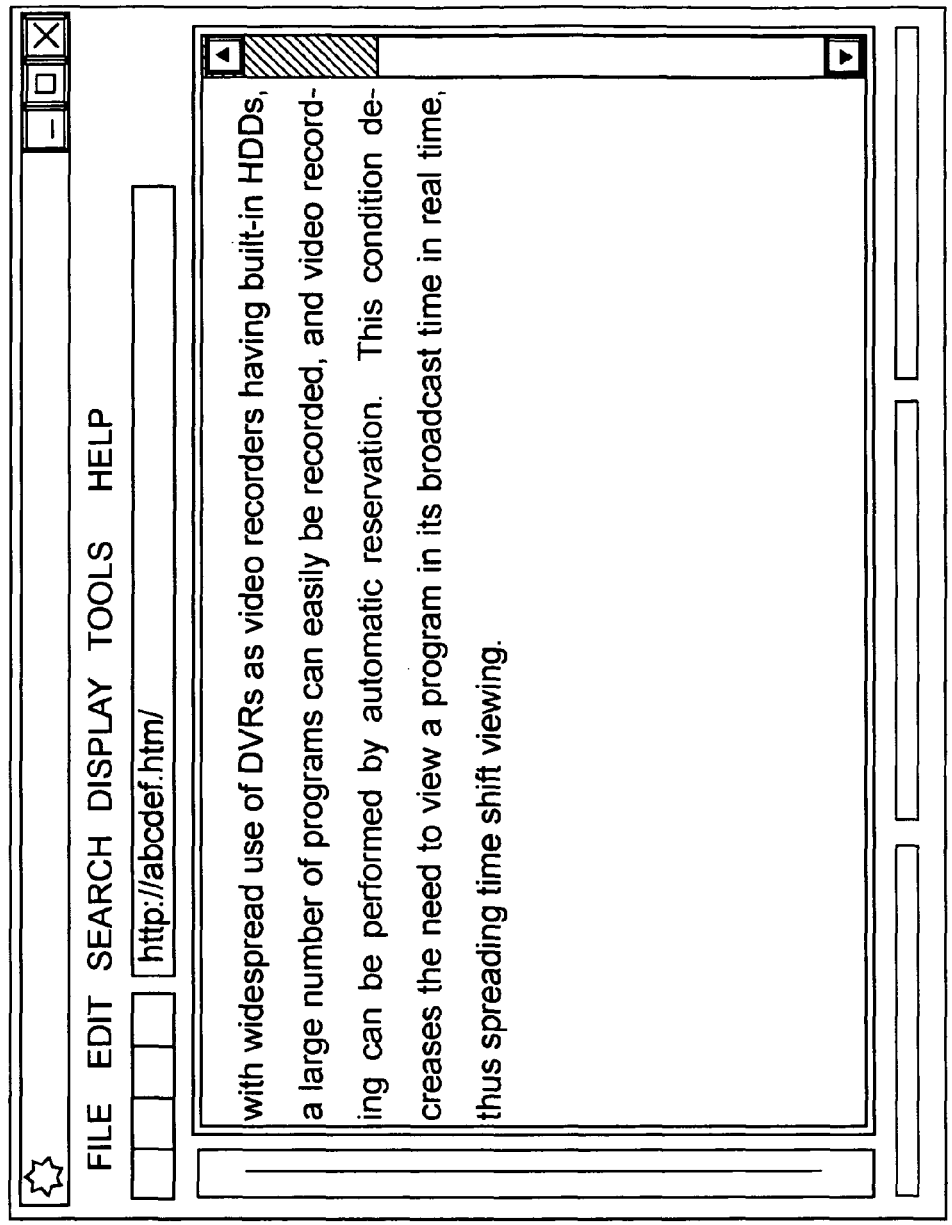
FIG. 24 is an illustration of an example of displaying data in the embodiment of the present invention.

In addition, it is assumed that, for the data subject to display, the range 300 shown in FIG. 23 is displayed and the image on the screen is as shown in FIG. 24. The image is in a state obtained by downwardly scrolling the data from the state shown in FIG. 22. In this case, the link 101 for "views" being selected by the cursor 100 is not displayed since it is hidden in an upper part of the screen. By operating the SET button 33 at this time, in step S205, it is determined that the link 101 for "views" being selected by the cursor 100 is not displayed, so that the CPU 20 returns to step S204 without performing any processing.

If, in step S204, the operation on one of the arrow buttons 32 is detected, the CPU 20 proceeds to step S206, and confirms whether a link 101 is assigned to the allow button 32. As described above, in step S404 in FIG. 12, assignment of the link 101 to the allow button 32 is performed.

If the operated allow button 32 has not assigned link, the CPU 20 proceeds to step S208. In step S208, it is determined whether the data on the screen is scrollable in the direction of the operated allow button among the (upward, downward, left, and right) arrow buttons 32. If the data is scrollable, in step S209, the data is scrolled by a predetermined amount in the direction of the operated allow button 32.

When scrolling of the data in the direction of the operation is difficult, for example, when the upward allow button among the arrow buttons 32 is pressed in a state in which a first part of the data is displayed as shown in FIG. 22, the CPU 20 returns to step S204 without performing any processing.

If, in step S206, it is determined that a link 101 is assigned to the operated allow button 32, the CPU 20 proceeds to step S207 and determines whether the link 101 is displayed on the screen. For example, it is assumed that the link 101 for "recording" is assigned to the upward allow button. If the upward arrow button is operated when the screen is in the state shown in FIG. 24, the link 101 for "recording" is not displayed on the screen. In this case, the CPU 20 proceeds from step S207 to step S208, and processing is performed regarding the present operation on the allow button 32 as a scroll operation. If the data on the screen is scrollable, in step S209, the data on the screen is scrolled before the CPU 20 returns to step S204. If scrolling of the data on the screen is difficult, the CPU 20 returns to step S204 without performing any processing.

In addition, for example, it is assumed that, in the display state shown in FIG. 22, the upward arrow button 32, to which the link 101 for "recording" is assigned, is operated. As described above, when the link 101 assigned to the operated allow button 32 is displayed, the CPU 20 proceeds from step S207 to step S210, and the cursor 100 is moved to the assigned link 101. In this case, the cursor 100 is moved to the portion "recording".

After, in step S210, the cursor 100 is moved, in step S216, displaying of the button icons 102 is temporarily finished. The CPU 20 returns to step S201, and executes the above-described link assigning process.

In other words, in this case, in response to movement of the cursor 100, re-assignment of links 101 to buttons (the numerical buttons 31) is performed.

In this case, in step S301 in FIG. 11, a button (e.g., the "5" button) represented by the assignment-start-button pointer 80 for the link 101 "recording" at which the cursor 100 is positioned is used as the current button, and the above-described assigning process is subsequently performed.

Figure 25:
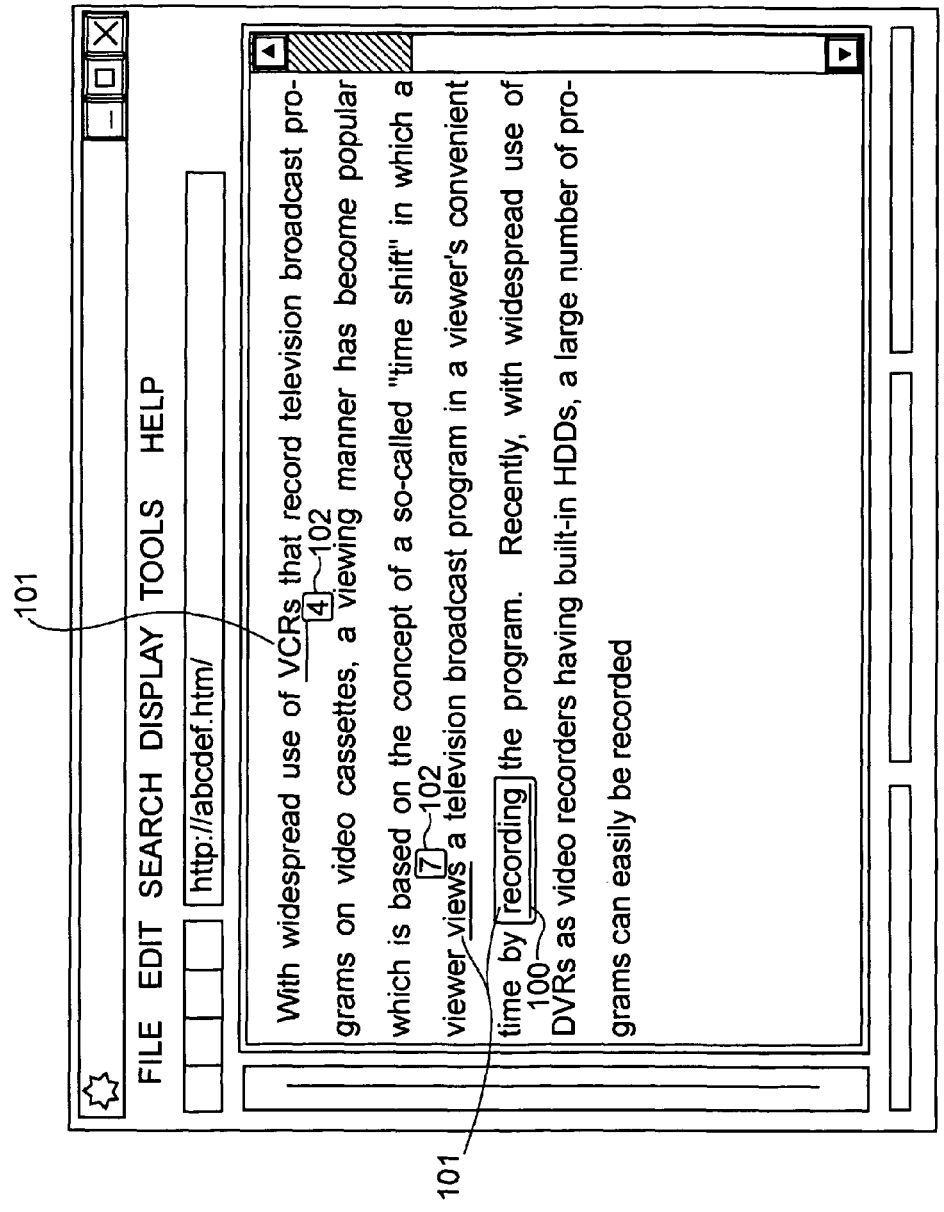
FIG. 25 is an illustration of an example of displaying data obtained after re-assignment in the embodiment of the present invention.

In other words, re-assignment is performed on the basis of the link 101 for "recording" and the "5" button. After that, when the button icons 102 are displayed in step S203, the screen is as shown in FIG. 25. Specifically, the cursor 100 is positioned at the link 101 for "recording", and the "4" button is assigned to the link 101 for "VCRs". Then, a button icon 102 indicating the "4" button is displayed. In addition, when the "7" button is assigned to the link 101 for "views", a button icon 102 indicating the "7" button is displayed.

If, in step S204 in FIG. 10, the operation on the display-on/off button is detected, the CPU 20 proceeds to step S221, and switches on and off the button-icon-display mode. When the button-icon-display mode is switched from on to off, in step S213, the display of the button icons 102 is switched off on the display screen. For example, if the display screen has been in the state shown in FIG. 1, it comes to be in the state shown in FIG. 26. When the button-icon-display mode is switched from off to on, in step S213, the display of the button icons 102 is switched on the display screen. For example, the display screen has been in the state shown in FIG. 26, it comes to be in the state shown in FIG. 1. After finishing step S213, the CPU 20 returns to step S204.

If, in step S204, an operation on an assigned button, for example, an operation on one the numerical button 31, is detected, the CPU 20 proceeds to step S214, and confirms whether a link 101 is assigned to the operated button. The CPU 20 returns to step S204 without performing any processing if no link 101 is assigned to the button. If the operated button has a link 101 assigned thereto, the CPU 20 proceeds to step S215, and determines whether the link 101 is displayed on the screen. If the link 101 corresponding to the operated button is displayed, the CPU 20 proceeds to step S217. If no link 101 is displayed, the CPU 20 returns to step S204.

For example, it is assumed that, in the display state shown in FIG. 22, the "1" button is operated. In this case, the link 101 for "VCRs" is assigned to the "1" button. Thus, the CPU 20 proceeds to steps S214 and S215, and further proceeds to step S217 since the link for the "VCRs" is displayed. Processing is performed in response to the link type before the process in FIG. 10 finishes.

For example, if the link 101 fro the "VCRs" is an URL, the URL is sent back, and step S105 in FIG. 9 finishes. In this case, the CPU 20 proceeds from step S106 to step S102, and data of the URL is acquired via the network 5 and is displayed.

In addition, it is assumed that, in the display state shown in FIG. 24, the "1" button is operated. In this case, the CPU 20 proceeds to steps S214 and S215 since the link 101 for the "VCRs" is assigned to the "1" button. However, the link "VCRs" is not displayed at this time. Accordingly, no processing is performed regarding the present operation on the "1" button as invalid, and the process returns to step S204.

If, in step S204, the operation of the browser button 34 is detected, the CPU 20 proceeds to step S211. In step S211, the CPU 20 sends back a termination command for termination the browser, and finishes the process in FIG. 10, that is, step S105 in FIG. 9. In this case, the CPU 20 stores the button-icon-display mode in step S107 in FIG. 9 before terminating the browser.

In this embodiment, the above-described browsing is performed. In particular, in browsing display in which the cursor 100 can be moved on links 101, the numerical buttons 31, etc., are automatically and dynamically assigned to other links 101 around the cursor 100. Also, button icons 102 indicating assigned buttons are displayed. When a button to which a link is assigned is operated, the operation is handled as a determining operation on the assigned link 101 to perform linking.

In other words, by operating a button corresponding to a button 102 indicated by a link 101, the user can perform a direct link-selecting operation, and, in an environment using no mouse, a very simplified operation realizes a link operation.

In addition, assignment of each link 101 to each button is performed in accordance with a positional relationship between the cursor 100 and the link 101. Thus, the assignment is user-friendly, thus also realizing comfortable operability.

Whenever the cursor 100 is positioned at a link 101, assignment of a button to a link 101 is performed in step S216 in FIG. 10 in accordance with a positional relationship between the display position of the cursor 100 and a different link 101. Therefore, even for cursor movement, button assignment is performed at all times in a state suitable for operation. This is also suitable for simplified operation.

As described with reference to FIGS. 19 and 20, the display position of the button icon 102 is dynamically calculated and displayed in accordance with the cursor position. Thus, the button icon 102 is displayed at an appropriate position in accordance with the position of the cursor 100, so that a button corresponding to a desired link 101 can be easily recognized for the user.

In addition, by switching on and off the button-icon-display mode, the display of the button icon 102 can be switched off when the user feels that the button icon 102 is unnecessary, whereby the display screen can be adapted for user's preference and idea. Furthermore, the assigning process in FIG. 12 is performed, whereby appropriate assignment adapted for system environments can be performed.

In this embodiment, if, in step S205 in FIG. 10, the link 101 at which the cursor 100 is positioned is not displayed, the operation on the SET button 33 is regarded as invalid. When an operation is performed on the assigned button is operated, if it is determined in step S215 that a link 101 to which the assignment button is assigned is not displayed, the operation on the button is regarded as invalid.

When the link 101 denoted by the cursor 100 is not displayed on the screen, in many cases, the user does not operate the SET button 33 by recognizing the link. Considering this point indicates that the operation on the SET button 33 is frequently a false operation. Moreover, the user strongly feels a discomfort in linking performed based on a link 101 that is not displayed on the screen. Accordingly, the determinations in steps S205 and S215 are performed to regard an operation on the link 101 that is not displayed on the screen, whereby user-friendly operation feeling and appropriate browsing can be realized.

If, in step S207, it is determined that a link assigned to one arrow button 32 is not displayed, by preventing the cursor from being moved to the link, user-friendly browsing is established. This is because sudden movement of the cursor to the invisible link at the time is not displayed.

The tuner apparatus 2 (television system) having the above-described browsing function is an information processing apparatus according to an embodiment of the present invention. In addition, the processes shown in FIGS. 9 to 19 represent an information processing method and program according to embodiments of the present invention.

A program in the tuner apparatus 2 according to the embodiment can be stored beforehand in, for example, the memory 21. Alternatively, as a form, it is possible that, after the program is stored in an external recording medium, the program be loaded into the memory 21.

The embodiment of the present invention has been described above. However, the present invention may have various modifications. In the above-described embodiment, an example with the tuner apparatus 2 and the monitoring apparatus 1 has been described. Embodiments of the present invention are applicable to different type audio-visual apparatuses such as television receivers and recording/playback apparatuses, and apparatuses such as personal computers, PDAs (personal digital assistants), and cellular phones.

In addition, the link portion (link 101) has been described as a processing region subject to processing. However, the processing region is not limited to the link portion. A region in which some type of processing is performed by positioning the cursor 100 is used as the processing region in the embodiment of the present invention, and the above-described processes in the above embodiment may be applied to such a region.

Embodiments of the present invention may be applied to various regions on the screen in which, by positioning the cursor 100 to the regions, some type of operation is executed, with each region as the processing region. The regions include various icons set so as to be clicked on, an operating element image, a text box, a pull-down list box, and a check input box. When the icon, the operating element image, and the pull-down list box are used as processing regions, operating element images are displayed, with them assigned to the icon, the operating element image, and the pull-down list box. In addition, when the operating element corresponding to the operating element image is operated, processing may be performed regarding a corresponding icon or the like as having been clicked on.

The program according to an embodiment of the present invention can be recorded beforehand in an HDD as a built-in recording medium of a personal computer, an AV (audio-visual) device, a PDA, a cellular phone, or the like, and in a ROM or the like in a microcomputer including a CPU.

Alternatively, the program can be temporarily or eternally stored (recorded) in removable recording media such as a flexible disk, a CD-ROM (compact-disc read-only memory), a MO (magneto-optical) disc, a DVD (digital versatile disc), a Blu-ray Disc, a magnetic disk, a semiconductor memory, and a memory card. The removable recording media can be provided as so-called "package software".

Moreover, the program according to the embodiment of the present invention can be installed into a device that uses the program, and can be downloaded from a download site networks such as a LAN (local area network) and the Internet.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing method for displaying, on a display screen, at least one processing region including a cursor and a link portion in which a link to other information is set, the method comprising:

assigning a one of a plurality of links in the processing region on which the cursor is currently positioned to a reference-positioned one of a plurality of operating elements of an operation input device;

assigning each other one of the plurality of links in the processing region to an other one of the plurality of operating elements based on
  a relative direction and a distance between the current position of the cursor on the display screen and positions of the plurality of links in the processing region and
  a relative position between the reference-positioned operating element and the plurality of operating elements;

displaying, in the processing region on the display screen, a reference image for each of the plurality of operating elements to reference each of the plurality of operating elements as assigned to a one of the plurality of links; and in response to an operation input from an assigned operating element, executing processing corresponding to the respective one of the plurality of links assigned to the operating element.

2. The information processing method according to claim 1, wherein, in assignment of the each one of the plurality of links in the processing region, when the displayed cursor is positioned in one processing region, in accordance with a positional relationship between a display position of the positioned cursor and a different processing region, the different processing region is assigned to the operating element of the operation input device.

3. The information processing method according to claim 1, further comprising:
switching on and off displaying the reference images for each of the plurality of operating elements in response to a particular operation input.

4. The information processing method according to claim 1, wherein,
when the reference images for each of the plurality of operating elements are displayed, in accordance with the distance between the current position of the cursor on the display screen and the each one of the plurality of links in the processing region, a display position of the reference images for each of the plurality of operating elements in the vicinity of the processing region is determined.

5. An information processing apparatus for displaying, on a display screen, at least one processing region including a cursor and a link portion in which a link to other information is set, comprising:
assigning means for
assigning a one of a plurality of links in the processing region on which the cursor is currently positioned to a reference-positioned one of a plurality of operating elements of an operation input device and
assigning each other one of the plurality of links in the processing region to an other one of the plurality of operating elements based on
a relative direction and a distance between the current position of the cursor on the display screen and positions of the plurality of links in the processing region and
a relative position between the reference-positioned operating element and the plurality of operating elements;
operating-element-image displaying means for displaying, in the processing region on the display screen, a reference image for each of the plurality of operating elements to reference each of the plurality of operating elements as assigned to a one of the plurality of links by the assigning means; and
processing executing means for executing, in response to an operation input from an assigned operating element, processing corresponding to the respective one of the plurality of links assigned to the operating element.

6. The information processing apparatus according to claim 5, wherein,
when the displayed cursor is positioned in one processing region, in accordance with a positional relationship between a display position of the positioned cursor and a different processing region, the assigning means assigns the different processing region to the operating element of the operation input device.

7. The information processing apparatus according to claim 5, wherein
the operation-element-image displaying means switches on and off displaying the reference images for each of the plurality of operating elements in response to a particular operation input.

8. The information processing apparatus according to claim 5, wherein,
in accordance with the distance between the current position of cursor on the display screen and the each one of the plurality of links in the processing region, the operation-element-image displaying means determines a display position of the reference images for each of the plurality of operating elements in the vicinity of the processing region.

9. A computer readable storage medium encoded with a computer readable program configured to cause an information processing apparatus to execute a method for allowing an information processing apparatus to execute displaying, on a display screen, at least one processing region including a cursor and a link portion in which a link to other information is set, the method comprising:
assigning a one of a plurality of links in the processing region on which the cursor is currently positioned to a reference-positioned one of a plurality of operating elements of an operation input device;
assigning each other one of the plurality of links in the processing region to an other one of the plurality of operating elements based on
a relative direction and a distance between the current position of the cursor on the display screen and positions of the plurality of links in the processing region and
a relative position between the reference-positioned operating element and the plurality of operating elements;
displaying, in the processing region on the display screen, a reference image for each of the plurality of operating elements to reference each of the plurality of operating elements as assigned to a one of the plurality of links; and
in response to an operation input from an assigned operating element, executing processing corresponding to the respective one of the plurality of links assigned to the operating element.

10. The computer readable storage medium according to claim 9, wherein,
in assignment of the processing region, when the displayed cursor is positioned in one processing region, in accordance with a positional relationship between a display position of the positioned cursor and a different processing region, the different processing region is assigned to the operating element of the operation input device.

11. The computer readable storage medium according to claim 9, further comprising:
switching on and off displaying the reference images for each of the plurality of operating elements in response to a particular operation input.

12. The computer readable storage medium according to claim 9, wherein,
when the reference images for each of the plurality of operating elements are displayed, in accordance with the distance between the current position of the cursor on the display screen and the each one of the plurality of links in the processing region, a display position of the reference images for each of the plurality of operating elements in the vicinity of the processing region is determined.

13. An information processing apparatus for displaying, on a display screen, at least one processing region including a cursor and a link portion in which a link to other information is set, the information processing apparatus comprising:
an assigning section that
assigns a one of a plurality of links in the processing region on which the cursor is currently positioned to a reference-positioned one of a plurality of operating elements of an operation input device and assigns each other one of the plurality of links in the processing region to an other one of the plurality of operating elements based on
- a relative direction and a distance between the current position of the cursor on the display screen and positions of the plurality of links in the processing region and
- a relative position between the reference-positioned operating element and the plurality of operating elements;

an operating-element-image displaying section that displays, in the processing region on the display screen, a reference image for each of the plurality of operating elements to reference each of the plurality of operating elements as assigned to a one of the plurality of links by the assigning means; and a processing executing section that executes, in response to an operation input from an assigned operating element, processing corresponding to the respective one of the plurality of links assigned to the operating element.

* * * * *